US012646507B2

(12) United States Patent
Lai et al.

(10) Patent No.: US 12,646,507 B2
(45) Date of Patent: Jun. 2, 2026

(54) TRAINING METHODS FOR LANGUAGE MODELS USING DATA GENERATION AND REINFORCEMENT LEARNING

(71) Applicant: Adobe Inc., San Jose, CA (US)

(72) Inventors: Viet Dac Lai, Eugene, OR (US); Trung Bui, San Jose, CA (US); Seunghyun Yoon, San Jose, CA (US); Quan Tran, San Jose, CA (US); Hao Tan, San Jose, CA (US); Hanieh Deilamsalehy, San Jose, CA (US); Abel Salinas, West Covina, CA (US); Franck Dernoncourt, Seattle, WA (US)

(73) Assignee: Adobe Inc., San Jose, CA (US)

( * ) Notice: Subject to any disclaimer, the term of this patent is extended or adjusted under 35 U.S.C. 154(b) by 244 days.

(21) Appl. No.: 18/220,910

(22) Filed: Jul. 12, 2023

(65) Prior Publication Data

US 2025/0022459 A1 Jan. 16, 2025

(51) Int. Cl.
*G10L 15/183* (2013.01)
*G10L 15/065* (2013.01)

(52) U.S. Cl.
CPC .......... *G10L 15/183* (2013.01); *G10L 15/065* (2013.01)

(58) Field of Classification Search
CPC .... G10L 15/183; G10L 15/065; G10L 15/063
USPC .............. 704/9–10, 202, 231, 232, 233, 251
See application file for complete search history.

(56) References Cited

U.S. PATENT DOCUMENTS

| | | | | |
|---|---|---|---|---|
| 10,388,272 | B1* | 8/2019 | Thomson | ................ G10L 15/22 |
| 2024/0119360 | A1* | 4/2024 | Lim | ........................ G06N 3/096 |
| 2024/0282094 | A1* | 8/2024 | Tsimpoukelli | ......... G06V 10/80 |
| 2024/0386202 | A1* | 11/2024 | Hoffman | ................ G06F 40/30 |

OTHER PUBLICATIONS

Radford et al., "Improving Language Understanding by Generative Pre-Training" 2018.
Shi et al., "Incorporating External POS Tagger for Punctuation Restoration" arXiv:2106.06731v1 [cs.CL] Jun. 12, 2021.
Nikolaos Stylianou and Ioannis Vlahavas., "CoreLM: Coreference-aware Language Model Fine-Tuning" arXiv:2111.02687v1 [cs.CL] Nov. 4, 2021.
Radford et al., "Language models are unsupervised multitask learners," 2019.
Alam et al., "Punctuation restoration using transformer models for high and low-resource languages," in Proceedings of W-NUT, 2020, pp. 132-142.

* cited by examiner

*Primary Examiner* — George C Monikang
(74) *Attorney, Agent, or Firm* — FIG. 1 Patents

(57) ABSTRACT

The disclosed method generates helpful training data for a language model, for example, a model implementing a punctuation restoration task, for real-world ASR texts. The method uses a reinforcement learning method using a generative AI model to generate additional data to train the language model. The method allows the generative AI model to learn from real-world ASR text to generate more effective training examples based on gradient feedback from the language model.

20 Claims, 19 Drawing Sheets

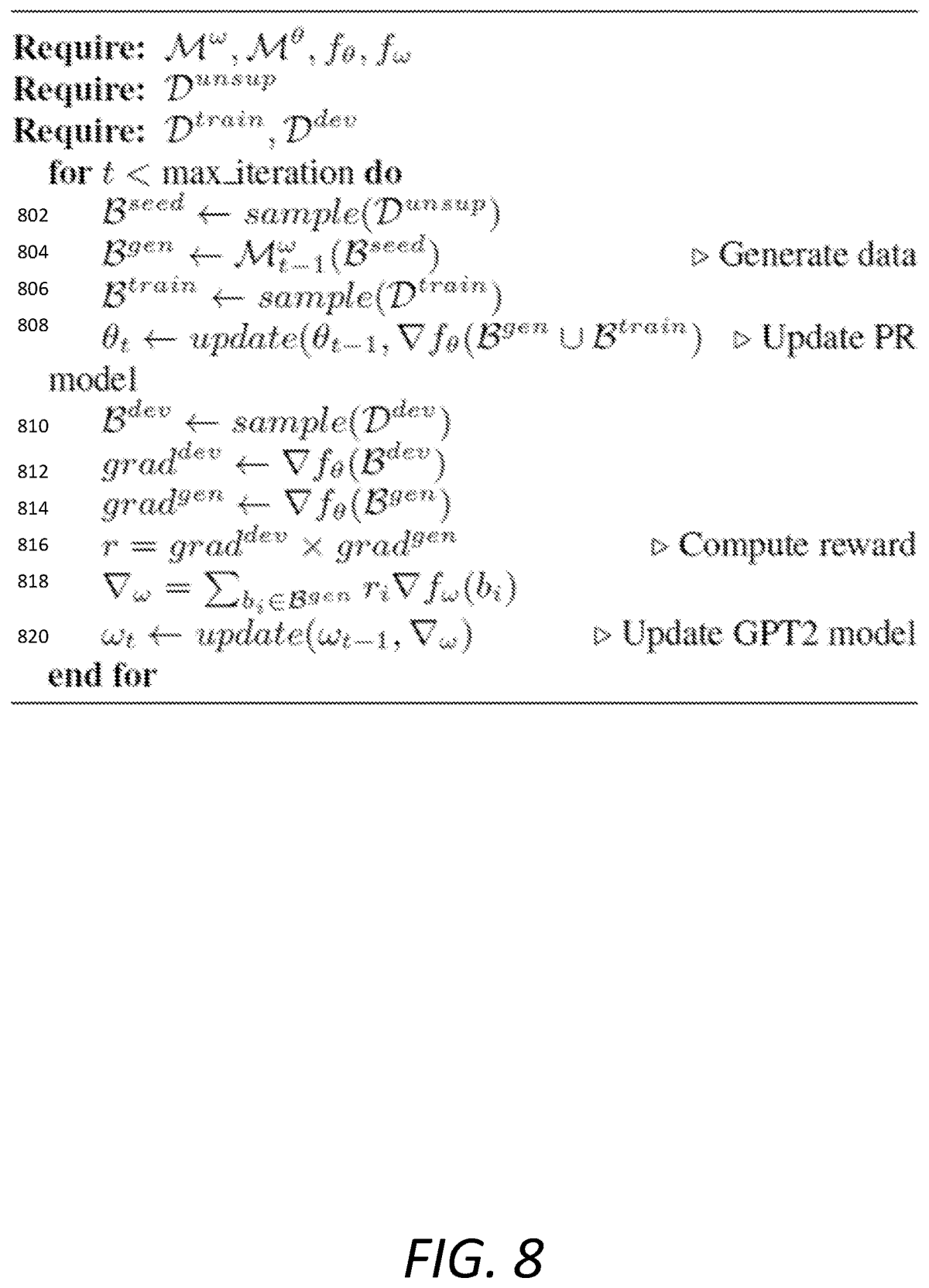

Require: $\mathcal{M}^{\omega}, \mathcal{M}^{\theta}, f_{\theta}, f_{\omega}$

Require: $\mathcal{D}^{unsup}$

Require: $\mathcal{D}^{train}, \mathcal{D}^{dev}$

> for $t <$ max_iteration do

802      $B^{seed} \leftarrow sample(\mathcal{D}^{unsup})$

804      $B^{gen} \leftarrow \mathcal{M}_{t-1}^{\omega}(B^{seed})$            ▷ Generate data 806      $B^{train} \leftarrow sample(\mathcal{D}^{train})$ 808      $\theta_t \leftarrow update(\theta_{t-1}, \nabla f_{\theta}(B^{gen} \cup B^{train}))$    ▷ Update PR model 810      $B^{dev} \leftarrow sample(\mathcal{D}^{dev})$ 812      $grad^{dev} \leftarrow \nabla f_{\theta}(B^{dev})$ 814      $grad^{gen} \leftarrow \nabla f_{\theta}(B^{gen})$ 816      $r = grad^{dev} \times grad^{gen}$            ▷ Compute reward 818      $\nabla_{\omega} = \sum_{b_i \in B^{gen}} r_i \nabla f_{\omega}(b_i)$ 820      $\omega_t \leftarrow update(\omega_{t-1}, \nabla_{\omega})$       ▷ Update GPT2 model > end for

*FIG. 8*

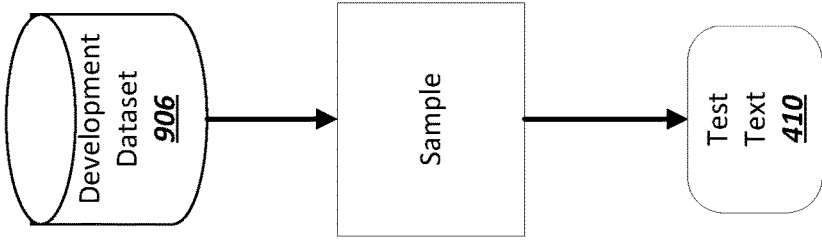
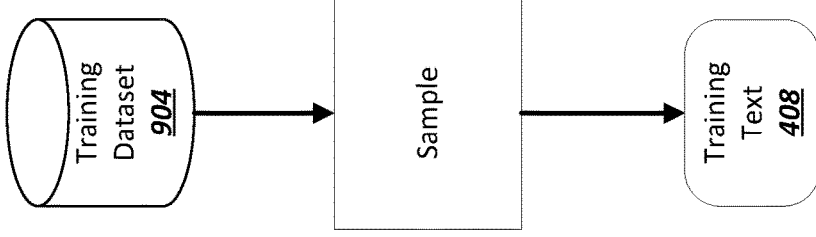
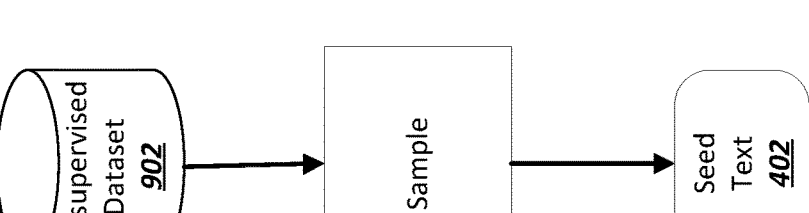
*FIG. 9*

*1400*

1500

COMPUTER-READABLE STORAGE MEDIUM
1702

Computer Executable
Instructions
1704

1700

SERVERS 1904

SERVER DATA STORES 1910

COMMUNICATION FRAMEWORK 1906

CLIENTS 1902

CLIENT DATA STORES 1908

1900

TRAINING METHODS FOR LANGUAGE MODELS USING DATA GENERATION AND REINFORCEMENT LEARNING

BACKGROUND

To improve the readability of text generated by automatic speech recognition (ASR) systems both for human consumption and for downstream natural language processing tasks, punctuation restoration (PR) is often used as an ASR post-processing step. Punctuation restoration is typically implemented using a deep learning artificial intelligence (AI) or machine learning (ML) model to restore the syntactic structure of ASR text to improve its readability. One problem with models implementing the punctuation restoration function is the lack of effective training data for use in training the model. While punctuated texts are abundant from written documents, discrepancies between written punctuated text and golden ASR text limits the usability of written texts for purposes of training punctuation restoration models for ASR texts.

SUMMARY

Exemplary embodiments are generally directed to improvements in training methods for PR models. The improvements are realized by improving the training data used to train the PR models. The training data comprises punctuated text similar to text that would be generated by a PR model on an input of unpunctuated text from an ASR model.

In an exemplary embodiment, the PR task is implemented using a sequence labeling language model. Using sequence labeling, each punctuation symbol becomes a label (e.g., period, comma, question mark) that is predicted by the trained sequence labeling model. The sequence labeling model is typically trained using unpunctuated text passages, wherein a loss is calculated based on a difference between the unpunctuated text passages and ground truth, punctuated versions of the text passages. Publicly available corpora of training texts are used to pretrain the PR model. In other embodiments, other types of AI/ML models are used to predict the placement of punctuation.

A generative AI model, for example, generative pre-trained transformer (GPT) such as GPT2, generates additional training text to augment the set of training data. The training text is combined with the generated text and the PR model is further trained on the combined training text and generated text. The PR model is updated using a reward generated by a loss function. The updated PR model is then fed the generated text as input, resulting in a first gradient, and a test text sampled from a development dataset, resulting in a second gradient. The generative AI model is fine tuned to generate more effective training text using a combination of the gradients. The training text is more effective when it is in the style of spoken speech.

The embodiments provide an advantage over the prior art of improving the generated text such that, over time, the text generated by the generative AI model resembles as closely as possible text derived from an ASR system, such that the generated text more effectively trains the PR model.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 is a listing of the steps of the training method in formal notation in accordance with at least one embodiment described herein.

FIG. 9 is a data flow diagram illustrating the sampling of datasets for each iteration of the training cycle in accordance with at least one embodiment described herein.

DETAILED DESCRIPTION

The exemplary disclosed embodiments are explained in the context of a PR model for use with ASR systems. However, it should be noted that the embodiments are not meant to be limited to this context and, in other embodiments, are used with any language model performing any task. Therefore, all uses of the term "PR model" should be interpreted to include any language model as well as other types of models performing other types of post-processing tasks.

Automatic Speech Recognition (ASR) is a key component in the processing of audio materials such as audio translation, voice assistants, and speech information extraction. Typical ASR systems produce chunks of transcription without any textual structures such as sentence and phrase boundaries. As a result, the readability of the generated ASR texts and the performance of systems for downstream tasks using this type of text (e.g., information extraction) are significantly degraded.

To address this issue, the punctuation restoration (PR) task is added to ASR systems as a post-processing step to improve the text readability and the performance of downstream tasks for ASR-generated texts. The goal of punctuation restoration is to restore the syntactic structure of generated ASR texts to improve readability. While punctuated texts are abundant from written documents, stylistic discrepancies between written punctuated texts and golden ASR texts limits the usability of written texts in training punctuation restoration systems for ASR texts.

Figure 1:
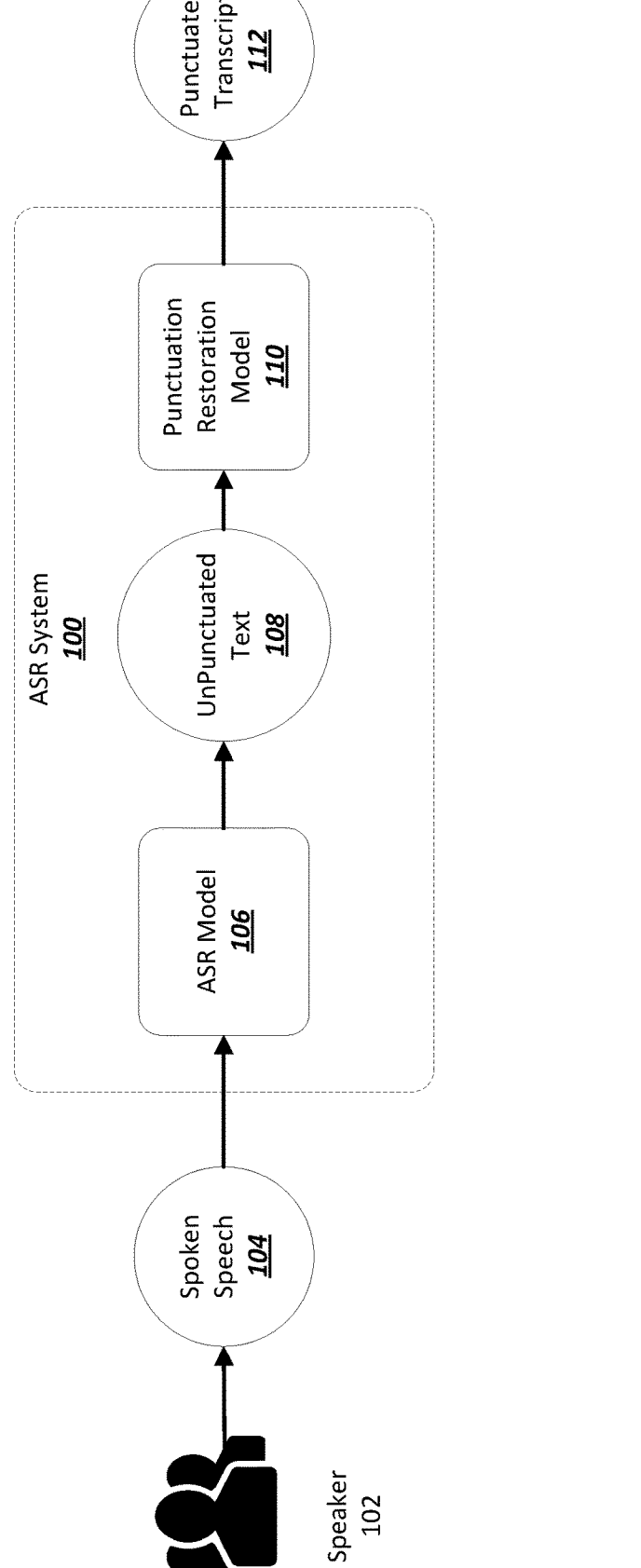
FIG. 1 is a block diagram illustrating an exemplary ASR system in accordance with at least one embodiment described herein.

FIG. 1 illustrates an exemplary ASR system 100 utilizing a punctuation restoration post-processing step. User 102 delivers spoken speech 104. Spoken speech 104 is live or recorded human speech. Some examples of spoken speech 104 include a monologue delivered by a person in a forum such as a speech delivered to a group of people (e.g., a TED Talk) or dictation of a user into a word processing program. Speech 104, in the form of an auditory signal, is input to ASR model 106.

Automatic Speech Recognition (ASR), also known as Speech to Text (STT), is the task of transcribing a given audio to text. Typically, ASR model 106 is implemented as an artificial intelligence (AI) model trained by machine learning (ML) to convert human speech 104 into text. ASR is a common technology used by many millions of people today. For example, Amazon's Alexa® system, and Apple's SIRI® digital assistants both use ASR technology to understand user requests. Another common use of ASR is voice recognition software transcribing spoken speech to text for use in word processing software.

ASR is a challenging task in natural language. It consists of a series of subtasks such as speech segmentation, acoustic modelling and language modelling to form a prediction (of sequences of labels) from noisy, unsegmented input data. The use of connectionist temporal classification (CTC) networks removes the need for pre-segmented data and allows the network to be trained end-to-end directly for sequence labeling tasks like ASR. A CTC network is a neural network output and associated scoring function for training recurrent neural networks to tackle sequence problems where the timing is variable, such as with spoken speech.

Figure 2:
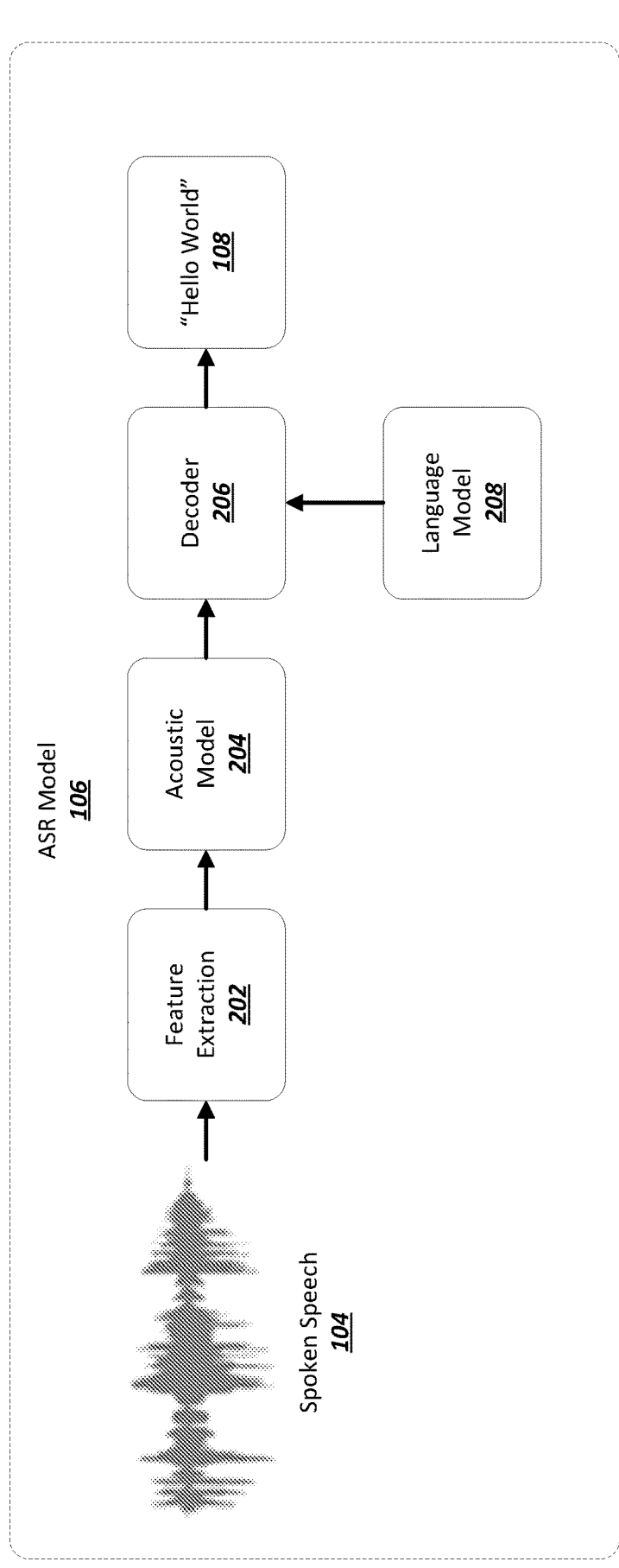
FIG. 2 is a block diagram illustrating an ASR model in accordance with at least one embodiment described herein.

An exemplary ASR model 106 is shown in FIG. 2. The model takes as input spoken speech 104 from user 102 in the form of an audio signal. The feature extractor 202 extracts features from the audio signal, and outputs the extracted features to the acoustic model 204. The acoustic model 204 is a CTC-based network that predicts the probability distributions over vocabulary characters c per each time step t. Decoder 106 uses a simple strategy wherein the character with the highest probability (e.g., using a temporal softmax output layer) is chosen at each time-step, without regard to any semantic understanding of what was being communicated. Repeated characters are removed or collapsed, and blank tokens are discarded. Optionally, a language model 208 is added to decoder 206 to provide context and correct mistakes in acoustic model 106. Decoder 206 weighs the relative probabilities of the softmax output against the likelihood of certain words appearing in context and determines what was spoken by combining both what acoustic model 106 thinks it heard with a likely next word. The best guess of ASR model 106 as to the text contained in spoken speech 104 is then output as text 108, which is typically unpunctuated. The pipeline shown in FIG. 2 is only one example of ASR model 106. There are many different types of systems that are appropriate for implementing the ASR task.

Such ASR models 106 typically produce unpunctuated text 108. While improper punctuation is not necessarily important for a digital assistant such as Alexa or SIRI, if the text produced by ASR module 106 is meant for human consumption or for further processing by downstream natural language processing tasks, punctuation is critical to improve the readability and to provide proper context for the text. Therefore, in a post-processing operation for the ASR system 100, a punctuation restoration (PR) model 110 adds punctuation to unpunctuated text 108 to produce a punctuated transcript 112 of the spoken speech 104.

Punctuation restoration is a challenging natural language processing task that introduces punctuation marks in the correct positions into an unpunctuated text 108, such as the output from ASR model 106. This process enables further downstream text processing and improves the readability of the text.

Figure 3:
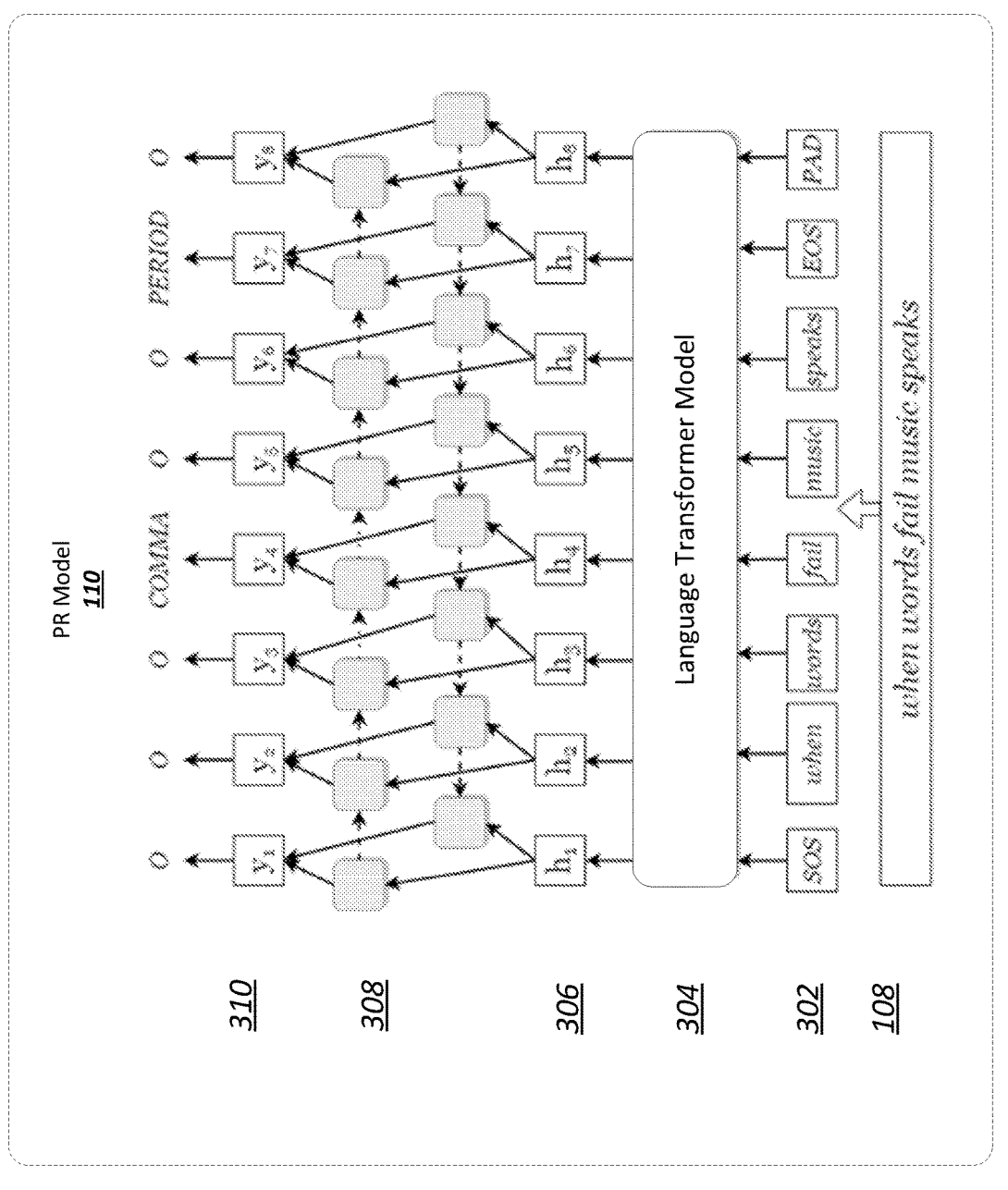
FIG. 3 is a block diagram illustrating a punctuation restoration model implemented as sequence labeling task in accordance with at least one embodiment described herein.

In some embodiments, PR model 110 is implemented as a word-level sequence labeling problem, as shown in schematic form in FIG. 3. Sequence labeling is a natural language processing task that classifies each token in a class space. In sequence labeling, each punctuation symbol becomes a label (e.g., comma, period, question mark) that sequence tagging models predict. Given a text input sequence 302 X={$w_1$, $w_2$, ... $w_N$}, where N is the number of words in the whole sequence, a large language transformer model 304, parameterized as $f_\theta$, encodes the input X into vector space 306 as H={$h_1$, $h_2$, ..., $h_N$}. The model uses bidirectional long-short term memory 308, making the neural network bidirectional, having sequence information in both directions-backwards (future to past) or forward (past to future). The ground truth corresponding to the input sequence is Y={$y_1$, $y_2$, ..., $y_N$} where $y_i$ belongs to a predefined list of punctuation marks. The model's prediction 310 is formalized as $\hat{Y}$={$\hat{y}_1$, $\hat{y}_2$, ..., $\hat{y}_N$}. PR model 110 is trained, in one embodiment, using a cross-entropy loss function given by Eq. (1). In other embodiments, other loss functions are substituted for the cross-entropy loss function.

$$\mathcal{L}_{CE} = -\frac{1}{N} y_i \log \hat{y}_i \tag{1}$$

The lack of training data is a major obstacle that hinders the performance of PR model 110 for real-world applications. Two factors have been identified that account for this issue. First, spoken speech 104 often involves a unique set of keywords as well as slang in spoken languages. A shift of topics in the source spoken speech 104 severely affects the ASR system 100 and PR model 110 without topic knowledge. Second, unlike other tasks where the unlabeled data is created by humans, the ASR model 106 generates the input of PR model 110. This creates a unique dependency that must be addressed by PR model 110.

Consequently, creating cost-effective datasets for a wide range of domains for PR is highly challenging. Moreover, naive adoption of available punctuated data is problematic. While large-scale punctuated text corpora are available, they are mostly written texts (REF texts), which are usually substantially well-punctuated. In contrast, ASR-generated texts (ASR texts) inherit a substantial amount of noise from both spoken language (e.g., verbal pauses) and the transcription process (e.g., word errors). Accordingly, if PR model 110 is trained on REF texts, it typically performs poorly on real-world ASR texts, such as unpunctuated text 108. In other words, directly using readily available written texts to train the PR module 110 does not help to improve the performance of the PR model.

To improve the quality of the generated text 406 for PR training, disclosed herein is a method to fine-tune generative model 404 in parallel with the training of PR model 110 to cause it to generate optimal customized texts for PR training. Particularly, a meta-learning framework is disclosed that considers generative model 404 as a meta-parameter for the training of PR model 110, in which generative model 404 is fine-tuned based on the performance of PR model 110 on a development dataset.

Figure 4:
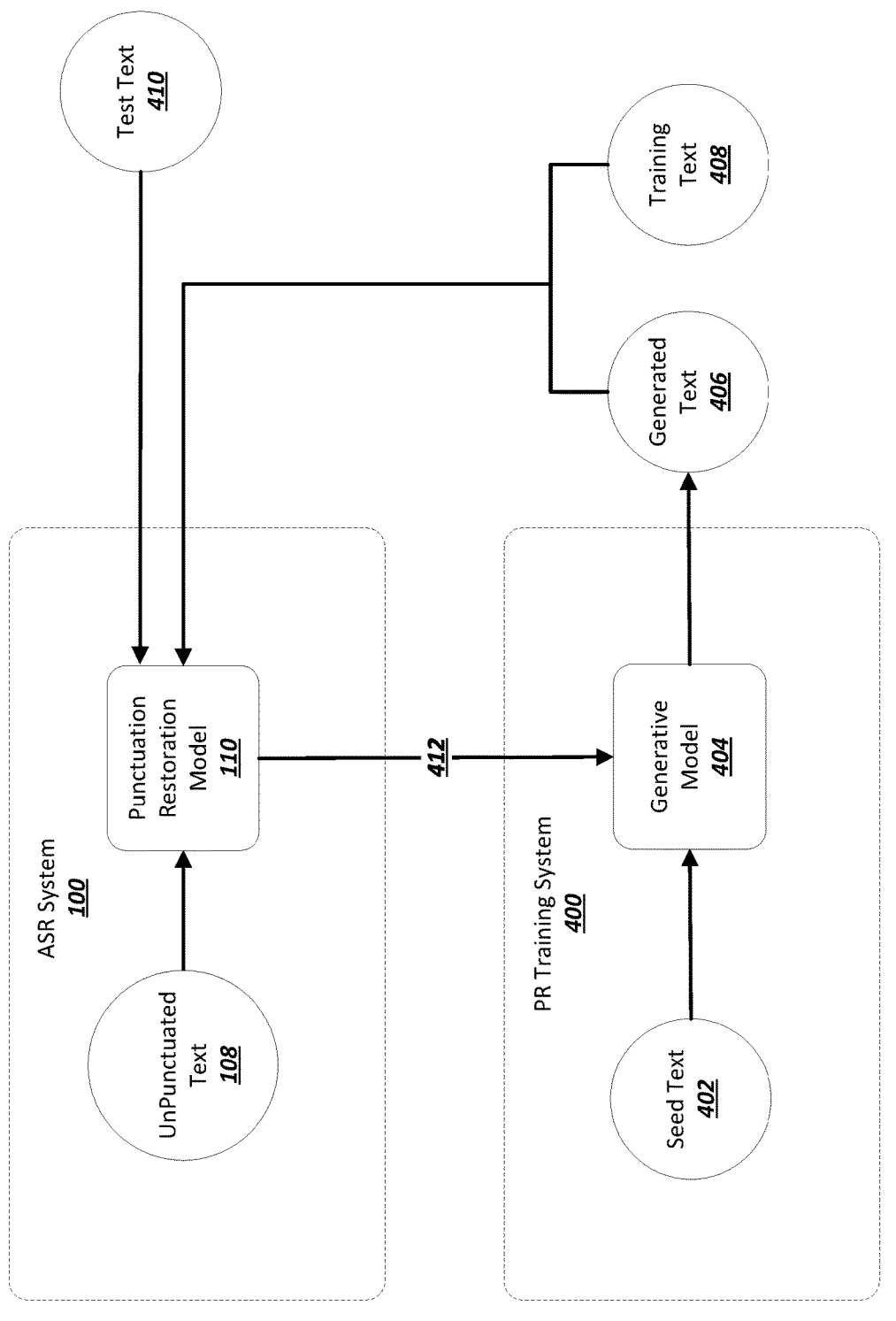
FIG. 4 is a block diagram illustrating an ASR system wherein the PR model and a generative model are trained in parallel in accordance with at least one embodiment described herein.

The various embodiments disclosed herein use a novel reinforcement learning method to bridge this gap using a generative model 404, which is illustrated as PR Training System 400 in FIG. 4. In particular, instead of manual annotation, a PR training system 400 implements a generative model 404 to create synthetic labeled data for the training of PR model 110. The PR training system 400 trains the generative model 404 to generate punctuated texts in the style of spoken speech, that in turn is easily converted to labeled data for training the PR model 110 of the ASR system 100.

A trivial solution is reinforcement learning, where the reward is calculated directly from the evaluation metrics of PR model 110 on the development set (e.g., the F1-score). However, obtaining a reliable, fast reward is challenging due to either the small scale of the evaluation or the computational cost of the evaluation that has to be done at every single iteration. As shown in FIG. 4, to alleviate this issue, a novel reward 412 is disclosed that relies on the gradients of PR model 110 obtained from the generated texts 406 and the development (test) dataset. In machine learning, a gradient refers to the mathematical concept of a vector that points in the direction of steepest ascent or descent of a function. The function in question is typically a loss function, which measures the difference between the predicted outputs of a machine learning model and the true outputs. When training a machine learning model, the goal is to minimize the loss function, which corresponds to finding the model parameters that yield the best predictions. This process is often achieved through an optimization algorithm called gradient descent, which utilizes the gradient. Intuitively, generated text 406 has a higher reward if the gradients of PR model 110 derived from the generated text 406 follows the expected gradients derived from the development dataset.

Thus, in each iteration, the generative model 404 produces generated text 406, and the PR training system 400 updates the PR model 110 using a combination of the generated text 406 and training text 408. The PR training system 400 calculates an average gradient of the updated PR model 110 over the generated text 406 for each training example. Additionally, the PR training system 400 calculates another average gradient of PR model 110 over one or more sampled subsets of the development (test) dataset. Finally, the PR training system 400 computes a reward 412 for each sample of generated text 406 using a combination of the two average gradients. In one embodiment, for example, the PR training system 400 computes the reward 412 using a cosine similarity score between the two gradients.

With reference to FIG. 4, the goal of the PR training system 400 is to fine-tune generative model 404 to encourage it to generate text similar to spoken speech 104, such that PR model 110 is more effectively able to process the output of ASR model 106 to complete the PR task. The generative model 404 receives a seed text 402 causing it to produce a passage of generated text 406. The PR training system 400 combines the generated text 406 with a sample of training text 408. The PR training system 400 updates the PR model 110 through a training cycle using the combined generated text 406 and training text 408. The updated PR model 110 then receives a test text 210 sampled from a development dataset, and, separately, the generated text 406. Based on the performance of PR model 110 on these two inputs, the PR training system 400 calculates a reward score 412 for generative model 404 and it updates the generated model 404 using reward 412.

If generative model 404 was pre-trained on written texts across diverse topics, a further issue arises that needs to be addressed. Having the topics in generated text 406 be unconstrained is suboptimal for some specific applications, such as gaming livestreaming. As such, also disclosed herein is a method to control the topic of the generated text 406. Instead of unconditional text generation, generative model 404 is fed an in-topic seed text 402 sampled from an in-topic unsupervised dataset. Generative model 404 is thus encouraged to generate more texts within the topic domain. The training of PR model 110 leverages this on-topic knowledge to obtain unlimited in-topic labeled texts.

Figure 5:
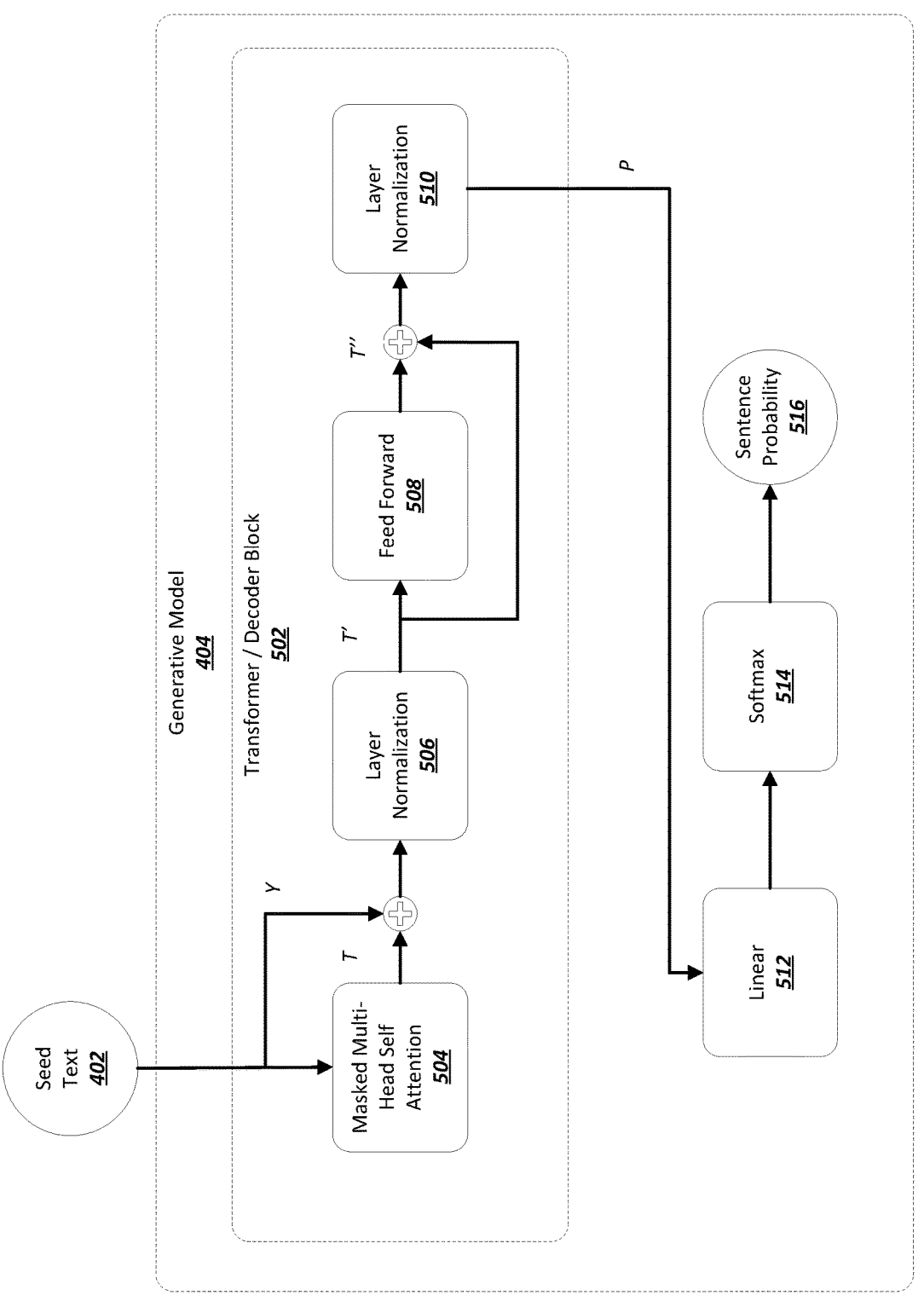
FIG. 5 is a block diagram illustrating the generative model as a GPT model.

In one embodiment, a generative pretrained transformer (GPT) model implements generative model 404. GPT is a language model relying on deep learning that generates human-like texts based on a given text-based input. A block diagram of a GPT model is shown in FIG. 5. A user "feeds" the model with a seed text 402, and multiple transformer/decoder blocks 502 create coherent paragraph-based information extracted from publicly available datasets. The architecture implements a deep neural network, specifically a transformer model, which uses attention in place of previous recurrence-based and convolution-based architectures. Attention mechanisms allow the model to selectively focus on segments of input text it predicts to be the most relevant.

GPT is a sentence generation method developed by OpenAI, a U.S. nonprofit artificial intelligence research institute, using a transformer/decoder structure. It is an autoregressive model using a masked self-attention structure in which the previous predicted output word is employed as the next input word during the sentence generation process because it has a good next word prediction ability based on given input words.

FIG. 5 shows the general structure of the GPT network for estimating the probability of a given sentence. It can be seen from this figure that the GPT network comprises stacked N transformer/decoder blocks 502, a linear layer 510, and a softmax layer 512. In particular, each transformer/decoder block 502 is composed of a masked multiheaded self-attention layer 504, a layer normalization layer 506, a feedforward layer 508, and a second layer normalization layer 510. In each of the masked multihead self-attention layers 504 the input text is transformed into a query matrix, a key matrix and a value matrix, which are used to construct an attention value matrix T that constitutes a linear layer.

Adding the residual input Y and applying layer normalization produces matrix T'. The feedforward layer 508, which consists of a linear layer, an activation function, and a second linear layer, takes matrix T' as input to produce matrix T". Matrix T" is added to the residual input matrix T' and subjected to layer normalization 510 to produce a matrix P as the output of the transformer/decoder block 502. The transformer/decoder blocks 502 are stacked as many times as needed, with the output of one block serving as the input to the next block. P is then linearized at 512 and passed through a Softmax layer 514 to produce a sentence probability 516. Thus, the GPT network operates by predicting the next word following an input sequence of words.

Figure 6:
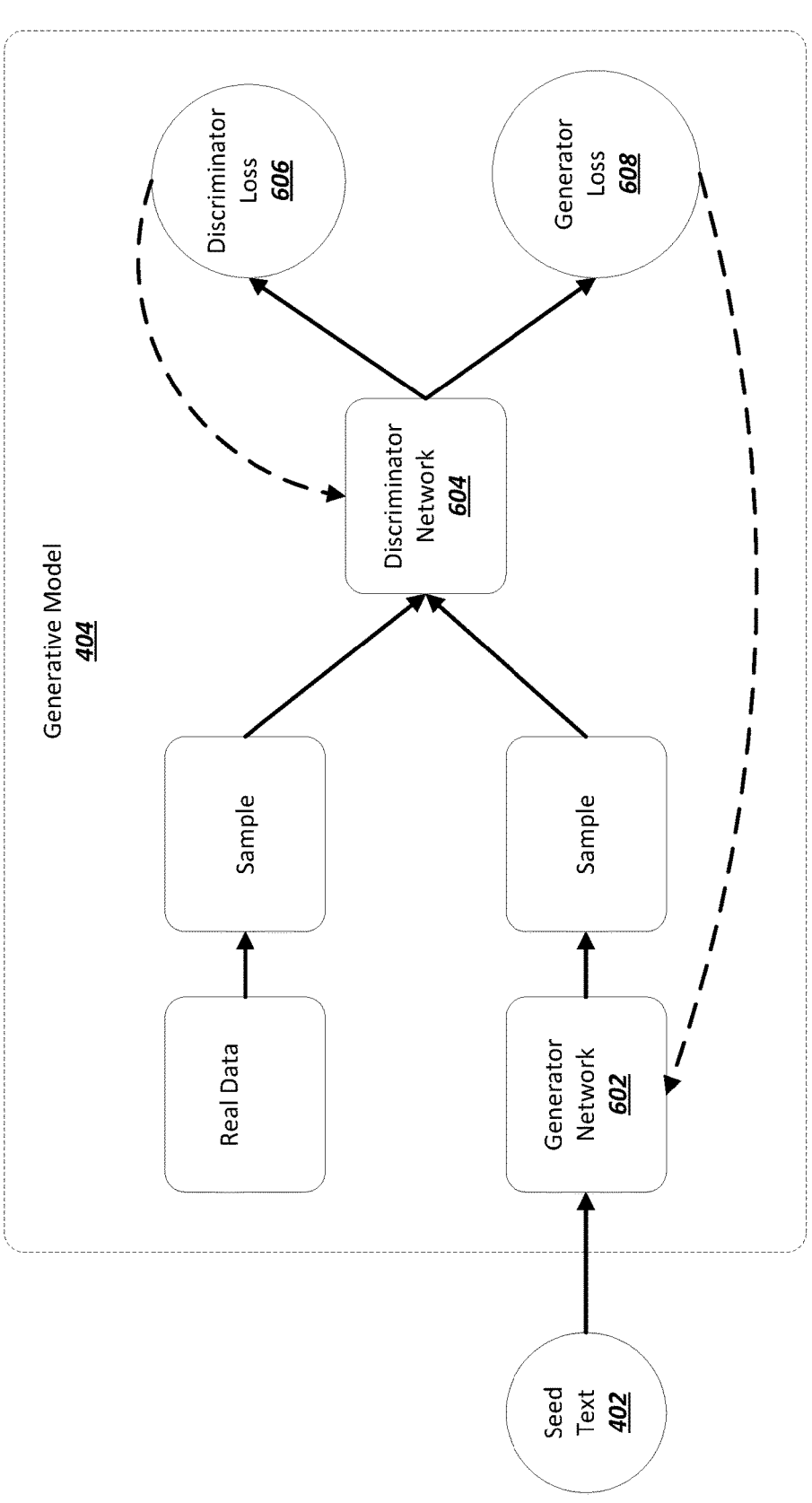
FIG. 6 is a block diagram illustrating the generative model as a GAN model.

In another embodiment, a generative adversarial network (GAN) implements generative model 404. FIG. 6 shows a typical architecture for a GAN in block diagram form. In a GAN network, "generative" describes a class of statistical models that contrast with "discriminative" models. The generative model generates new data instances, while the discriminative model discriminates between different kinds of data instances. Generative models use neural networks to identify patterns and structures within existing data to generate new and original content. For example, the generative network generates new photos of animals that look like real animals, while a discriminative network determines if a photo depicts a dog or a cat. A generative adversarial network (GAN) is a machine learning model in which two neural networks compete with each other by using deep learning methods to become more accurate in their predictions. The two neural networks that make up a GAN are referred to as the generator network 602 and the discriminator network 604. Generator network 602 is a convolutional neural network and discriminator network 604 is a deconvolutional neural network. The goal of generator network 602 is to artificially manufacture outputs that easily pass for real data. The goal of the discriminator network 604 is to identify which of the outputs it receives have been artificially created. Output of generator network 602 is connected directly to the input of discriminator network 604. Discriminator network 604 generates discriminator loss 606 and generator loss 608. Through backpropagation, the classification of discriminator network 604 provides a signal that generator network 602 uses to update its weights.

Figure 7:
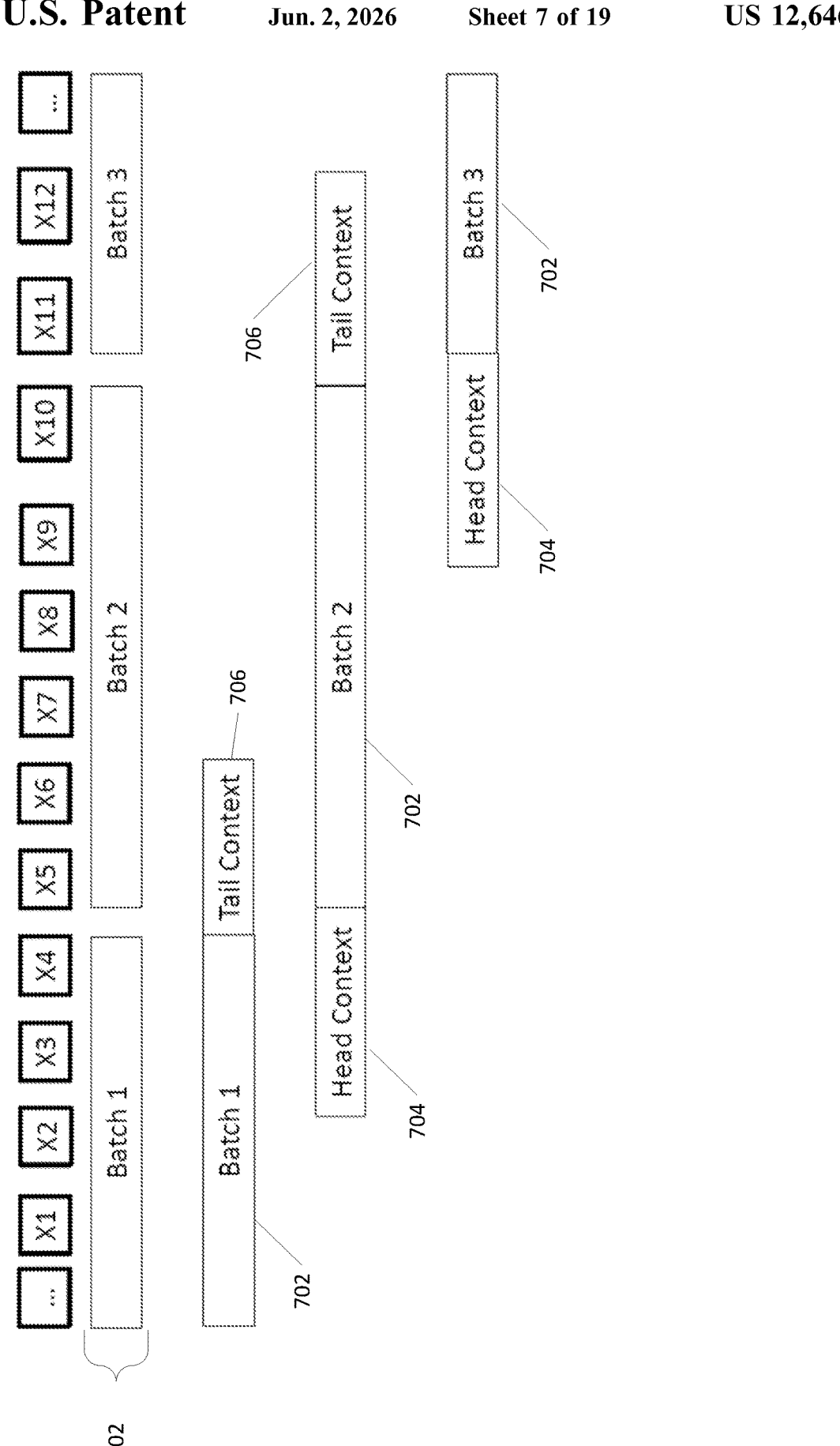
FIG. 7 illustrates the preprocessing of input data to the PR model, showing the batching of the input data and the augmentation of the input to include head and tail context in accordance with at least one embodiment described herein.

To fit very long input sequences into a large language model, the input sequence must be split into shorter segments (batches 702) of the same size, as shown in FIG. 7. Due to the randomness of the batching, the predictions of the edge tokens are severely affected due to the lack of preceding or following contexts. To overcome this, an additional preceding head context 704 and following tail context 706 are added to batch 702 to help the large language model better encode the sequence for the PR task, especially for predicting the beginning and ending words of the batch. In particular, C preceding words and C following words are concatenated to the to the input batch, if they are available, resulting in the input sequence $X_C=\langle C, X, C \rangle$ being fed to PR model 110. In one embodiment, the head and tail of each batch 702 comprises C=20 context words. Labels for these C additional tokens are not predicted by PR model 110 to avoid prediction conflict with the preceding and tailing batches, as well as to prevent recurrence of the lack of context.

Discrepancies between training data and testing data is a crucial problem in the punctuation restoration task. The training texts obtained from written text, however, do not reflect the noise in the actual spoken text that is transcribed by an ASR system. As such, to introduce noise to the text, three strategies are used to augment the training text: duplication, alteration and deletion, with respective augmentation probabilities of $\alpha_1$, $\alpha_2$, $\alpha_3$. In one embodiment, the augmentation ratios $\alpha_1$, $\alpha_2$, $\alpha_3$ are set to 5%.

FIG. 8 illustrates an exemplary training method in formal notational form. $\mathcal{M}^\theta$ represents the PR model 110 in formal notation as having transform function $f_\theta$ and $\mathcal{M}^\omega$ represents generative model 404 as having transform function $f_\omega$. The method uses three datasets, an unsupervised dataset ($\mathcal{D}^{unsup}$), a training dataset, ($\mathcal{D}^{train}$) and a development dataset ($\mathcal{D}^{dev}$). In one embodiment, datasets $\mathcal{D}^{train}$ and $\mathcal{D}^{dev}$, were derived from transcripts of TED talks before 2012, while dataset $\mathcal{D}^{unsup}$ was derived from transcripts of TED talks from 2013 to 2017. In other embodiments, any other corpora of punctuated text would work equally well.

The method samples the unsupervised dataset ($\mathcal{D}^{unsup}$) at step 802 of to obtain seed text 402 ($\mathcal{B}^{seed}$). At step 804 of the method, seed text 402 ($\mathcal{B}^{seed}$) is input to the current version of generative model 404

$$(\mathcal{M}_{t-1}^\omega)$$

to obtain generated text 406 ($\mathcal{B}^{gen}$). At step 806 the method samples training dataset ($\mathcal{D}^{train}$) to obtain training text 408 ($\mathcal{B}^{train}$). The method combines training text 408 and generated text 406 ($\mathcal{B}^{gen} \cup B^{train}$) and updates the current version of PR model 110 ($\theta_{t-1}$) at step 808 using the combined generated text 406 and training text 408 to create a new version of PR Model 110 ($\theta_t$).

At step 810, the method samples the development dataset ($\mathcal{D}^{dev}$) to obtain test text 410 ($\mathcal{B}^{dev}$). At step 812, the method inputs test text 410 ($\mathcal{B}^{dev}$) to PR model 110, represented by transform function $f_\theta$, to obtain a first gradient ($grad^{dev}$) of PR model 110 based on the input of test text 410. The method obtains a second gradient ($grad^{gen}$) of PR model 110 at step 814 based on the input of generated text 406 ($\mathcal{B}^{gen}$). At step 816, the method calculates reward 412 (r) based on the first and second gradients. In one embodiment, the first and second gradients are combined using cosine similarity. At step 818, the method uses reward 412 (r) to increase or decrease the gradients ($\nabla_\omega$) of the generative model 404. At step 820, the method updates the current version of generative model 406 ($\omega_{t-1}$) using the gradients $\nabla_\omega$ and creates a new version of generative model 406 ($\omega_t$).

In one embodiment, the method terminates when reward 412 no longer produces a significant increase or decrease in the gradients of the generative model 406 (i.e., when reward 412 is maximized). In other embodiments, the method terminates after when a predetermined number of training iterations is reached.

In one embodiment, PR model 110 is pre-training on the training dataset ($\mathcal{D}^{train}$) prior to implementation of the disclosed method to create a pre-trained version of PR model 110.

FIG. 9 shows the sampling of the datasets. Unsupervised dataset 902, training dataset 904 and development dataset 906 all contain examples of unpunctuated text. In one embodiment, these datasets comprise transcripts from TED talks. Seed text 402 is a sample of unsupervised dataset 902. The generative model 402 uses seed text 402 as an input to produce generated text 406. Training text 408 is a sample of training dataset 904. Training text 408 is combined with generated text 406 and used to update PR model 110. Test text 410 is a sample of development dataset 906. Test text 410 is input to PR model 110 to generate one of the gradients used to calculate reward 412. The size of the samples varies in different embodiments.

Figure 10:
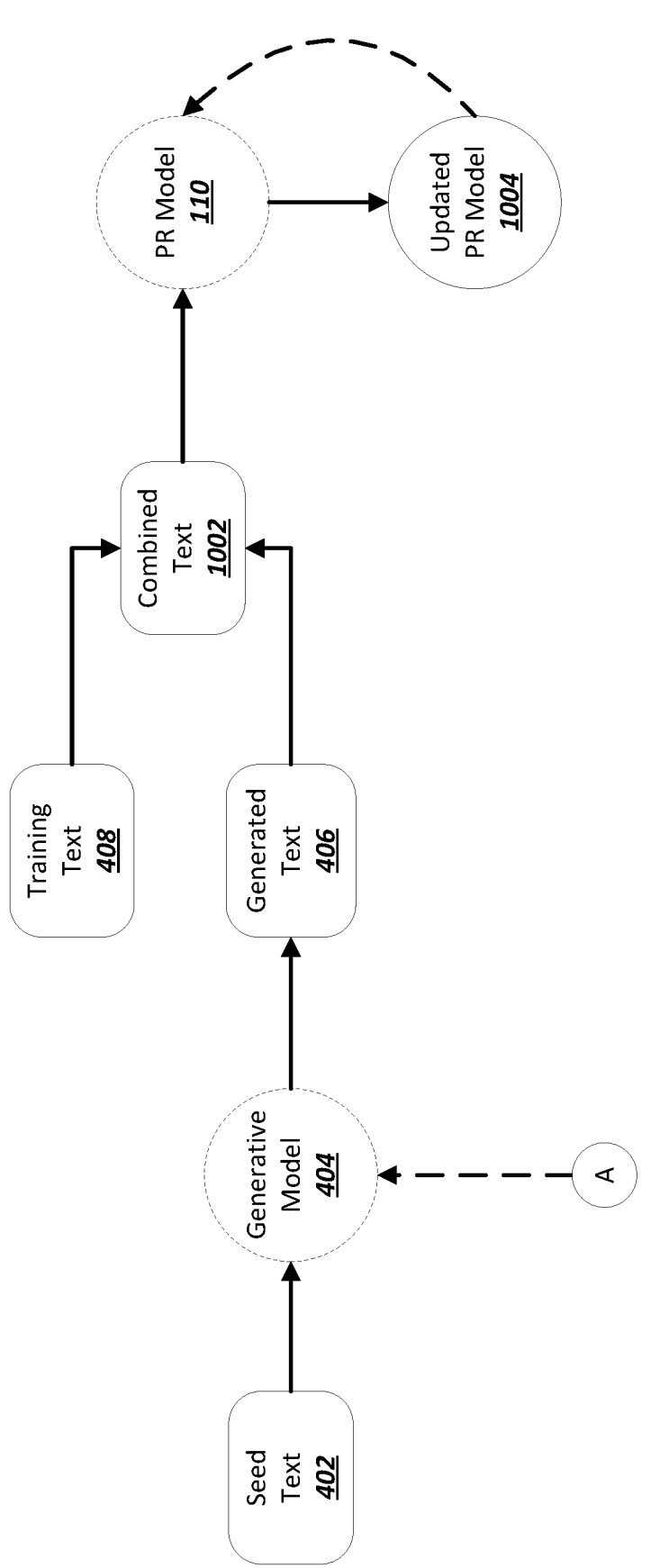
FIG. 10 is a data flow diagram illustrating a first portion of the training method in which the PR model is trained on a combination of training text and generated text in accordance with at least one embodiment described herein.

With reference now to FIG. 10, as previous discussed, generative model 404 produces generated text 406 based on an input of seed text 402. In the particular embodiment wherein generative model 404 is GPT2, the open source GPT2 model is pre-trained on a massive amount of unsupervised learning text across many topics. As such, it generates a long piece of text given just a short seed text 402, which controls the topic of generated text 406.

Figure 11:
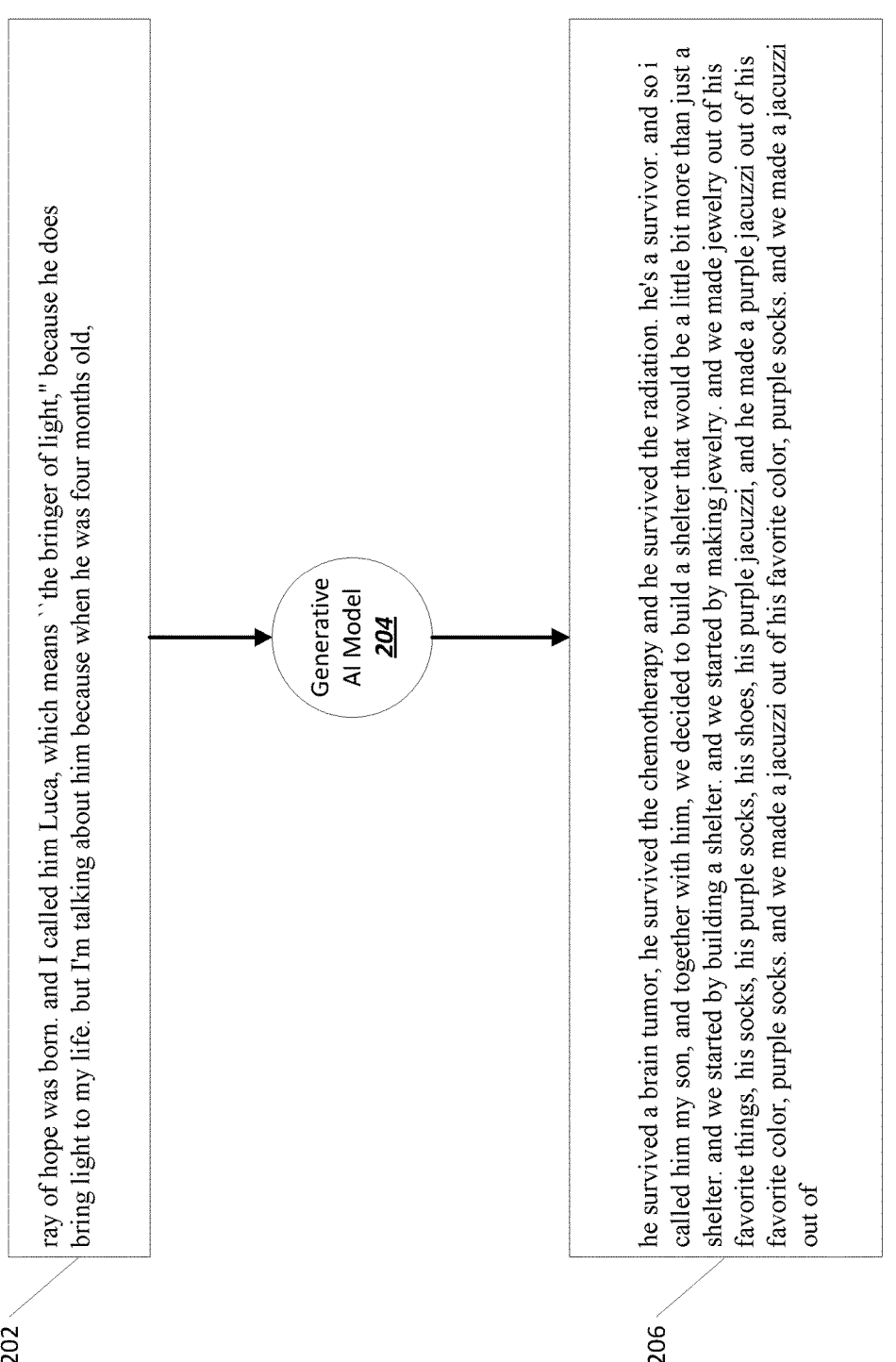
FIGS. 11-12 show examples of text generated by the generative model based on a seed input showing that the domain of the generated text is controlled by the seed text.
Figure 12:
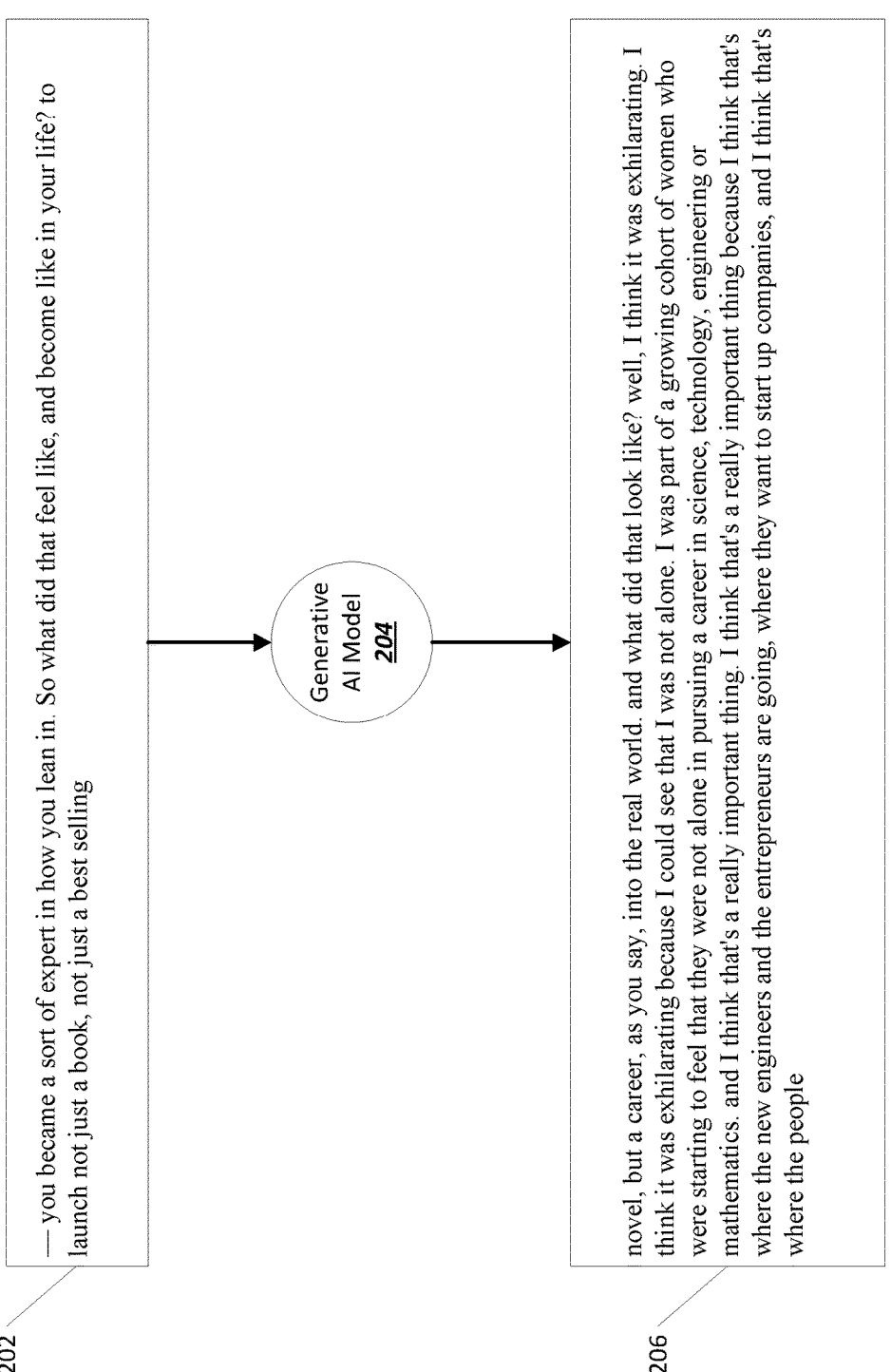

Examples of generated data 406 and the seed texts 402 that generated them are shown in FIGS. 11 and 12. In FIG. 11, the seed text deals with an infant named "Luca". Based on this seed text 402, generative model 404 produces generated text 406 which discusses that Luca is a cancer survivor and that he and a parent are building a shelter. Although slightly non-sensical, the generated text 406 is punctuated and in the style of spoken speech 104. That is the goal of generative model 404, to produce generated text 406 that is punctuated and in the style of human speech. FIG. 12 shows a similar result. Seed text 402 talks about launching a book and generated text 406 follows on with how being a best-selling author is a career and how the author is part of a cohort of woman in the STEM fields. Again, the generated text 406 is punctuated and in the style of human speech and is thus more effect as training data for PR model 110 than would be straight written text.

Seed texts 402 are sampled from unsupervised dataset 902, which, in one embodiment, has a topic-specific domain. Alternatively, unsupervised dataset 902 contains more unrelated texts. An unsupervised dataset 902 having a coherent topic domain is more effective than an incoherent topic domain in fine-tuning the generative model 404 to generate topic-specific text. In one embodiment, seed text 402 is 64 words in length and the generated text 406 is 256 words in length (which includes the 64 words in seed text 402). In other embodiments, the length of both seed text 402 and generated text 406 vary.

With further reference now to FIG. 10, the generated text 406 combines with the training text 408 sampled from the training dataset 904 to create combined text 1002. Generated text 406 and training text 408 combine, for example, by concatenation or by any other known means. The sizes of generated text 406 and training text 408, as well as the ratio of one to the other, vary in various embodiments. Combined text 1002 updates PR model 110 using, in one embodiment, the cross-entropy loss function in Eq. (1), to create updated PR model 1004. Updated PR model 1004 becomes PR model 110 for the next iteration of the method.

The generative model 404 is helpful in generating well-punctuated in-topic data. However, as the generation is done independently from PR model 110, the generated data inherits the written language style from the memory of generative model 404. As a result, the generated text 406 is not optimal for the PR task. The ultimate goal of PR is to be used for spoken language. As such, it is necessary that PR model 110 provide feedback to generative model 404 to fine-tune generative model 404 in parallel with the training of PR model 110. The guidance from PR model 110 makes generative model 404 generate text more in the style of spoken speech 104.

One way to measure the effectiveness of generated text 406 is the performance of PR model 110 (e.g., overall F1-score) over the development dataset 906. However, using a discrete measure like the F1-score leads to a high variance reward and, hence, an inaccurate estimation. Moreover, it is a goal to train generative model 404 such that it learns to generate a sample generated text 406 that resembles the language style in the development dataset 906. This portion of the method is shown in FIG. 13.

Figure 13:
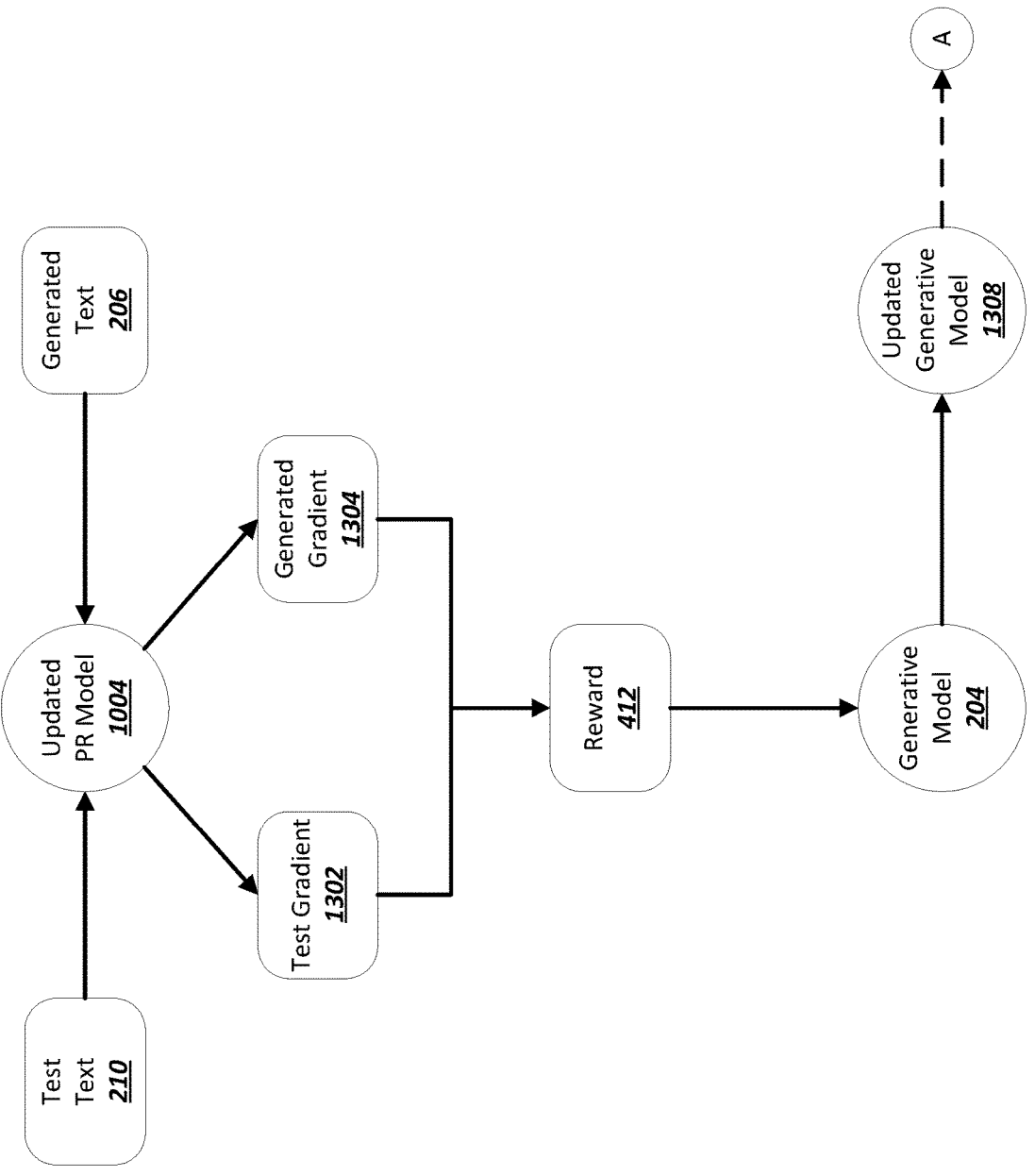
FIG. 13 is a data flow diagram illustrating a second portion of the training method in which the generative model is fine-tuned based on a reward calculated from gradients from the language model in accordance with at least one embodiment described herein.

As illustrated in FIG. 13, updated language model 1004 takes test text 410 as input to obtain test gradient 1302 and takes generated text 406 as input to obtain generated gradient 1304. In some embodiments, generated gradient 1304 is an average gradient of the PR model 110 over the generated text 406 for each training example. The test gradient 1302 is an average gradient of PR model 110 over a sampled subset of the development dataset 906. The calculation of reward 412 for each generated text 406 uses a combination of the two averages. In one embodiment, the two averages combine using a cosine similarity score between the two gradients. In other embodiments, the two gradients combine using other methods or functions. Due to the high cost of evaluating updated language model 1004 on the whole development dataset 906, in one embodiment the test gradient 1302 and reward 412 for each iteration are computed using only a sample subset $|\mathcal{B}_j|=16$ samples from development dataset 906. The calculation of reward 412 for those $\mathcal{B}_j$ samples uses the generated gradient 1304.

The calculation of reward 412 ($r_i$) use test gradient 1302 and generated gradient 1304. The calculation of an increase or decrease in the gradients of generative model 404 use reward 412. Intuitively, generated text 406 is similar in style to human language if the gradient updates of PR model 110 trained on generated text 406 and development dataset 906 are aligned. Formally, the computation of reward $r_i$ for each batch of generated text 406 is:

$$r_i = \nabla_\theta \mathcal{L}(\mathcal{B}_i^{gen}, \theta_{t-1}) \cdot \sum_{\mathcal{B}_j < \mathcal{D}^{dev}} \frac{\nabla_\theta \mathcal{L}(\mathcal{B}_j, \theta_{t-1})}{|\mathcal{D}^{dev}|} \qquad (2)$$

where $\mathcal{L}(\mathcal{B}, \theta_{t-1})$ is the cross-entropy loss of training the PR model 110

$$\left(\mathcal{M}_{t-1}^\theta\right)$$

on the sample $\mathcal{B}$ and "•" denotes a dot product. Finally, the update of generative model 404 uses the increased or decreased gradients to create updated generative model 1308 to maximize negative log-likelihood using Eq. (3). Updated generative model 1308 becomes generative model 404 for the next iteration of training. The iterations continue until the reward is maximized or until a predetermined number of iterations is reached.

$$\mathcal{L}_g = -\sum_{\mathcal{B}_j \in \mathcal{D}^{dev}} r_i \log P(\mathcal{B}_i) \qquad (3)$$

Figure 14:
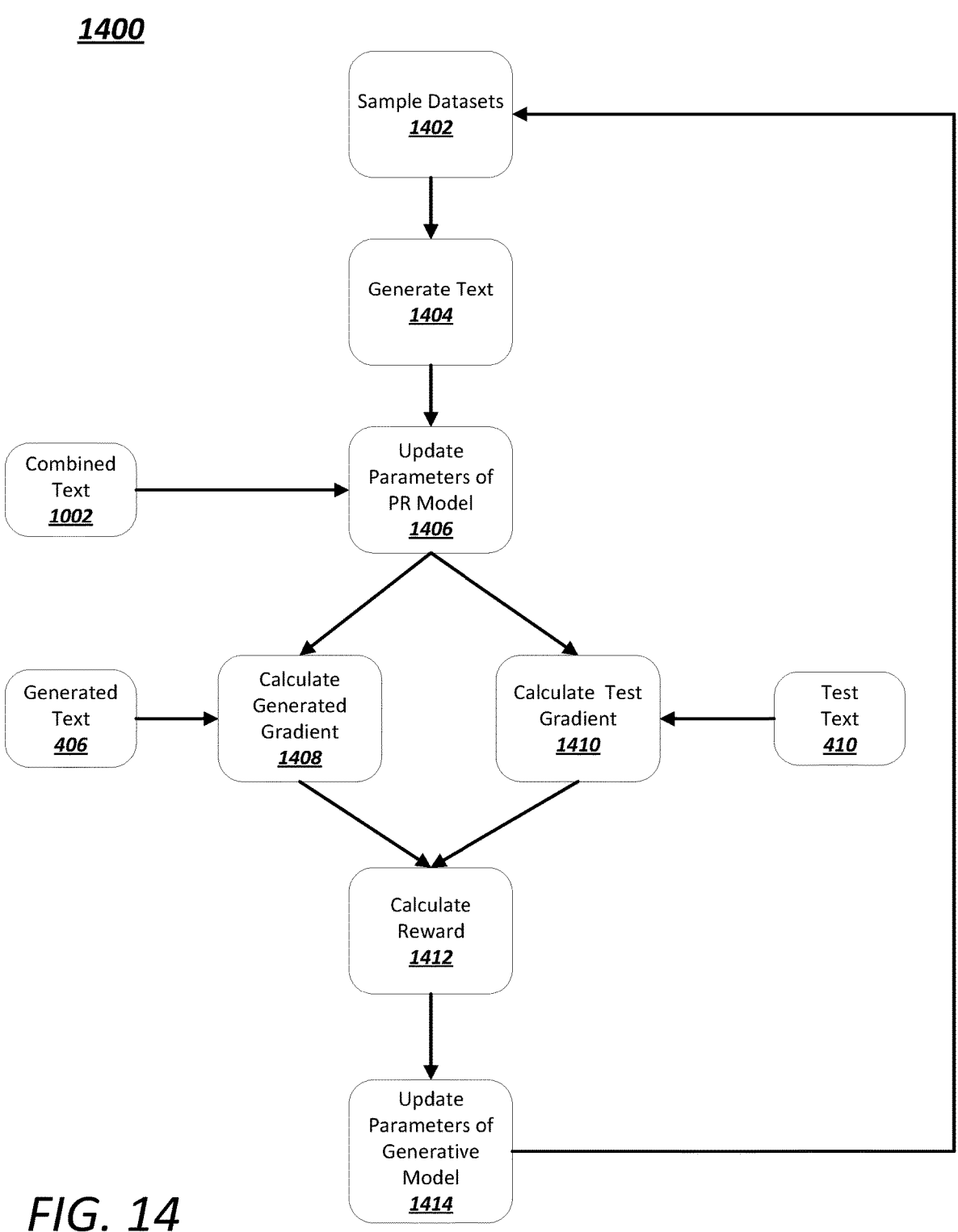
FIG. 14 is a flow chart illustrating the overall training method in accordance with at least one embodiment described herein.

The method is shown in flowchart form in FIG. 14. The method samples databases 902, 904 906 at step 1202 and generative model 404 produces generated text 406 at step 1204. At step 1206, the method updates the parameters of PR model 110 based on combined text 1002 to create updated PR model 1004. At step 1208, updated PR model 1004 takes generated text 460 as input to create generated gradient 1304 and, at step 1210, updated PR model 1004 takes test text 210 as input to create test gradient 1302. The method calculates reward 412 at step 1212 and updates the parameters of generative model 404 at step 1214 as previously described based on reward 412.

While the disclosed method has been explained in terms of training of PR model 110, the method also generates more effective training data for any language model performing any function. The reinforcement learning method uses a generative model 404, for example, GPT2, to generate additional data to train PR model 110. This method allows generative model 404 to learn from real-world ASR text to generate more helpful training examples based on gradient feedback from PR model 110.

The method was evaluated on two available English datasets. International Workshop on Spoken Language Translation (IWSLT) is the benchmark dataset for the PR task in English. The datasets annotate three prominent punctuation marks: period, comma, and questions mark. The IWSLT corpus contains texts derived from TED Talks, which are mainly monologues. The testing set of this corpus contains both reference text (REF), which is well-written text, and transcribed text (ASR) with manually inserted punctuation, whereas the training dataset consists of only REF text. The training, development, and test datasets contain approximately 2.1 M, 300K, and 12K words, respectively.

BehancePR is a human-annotated dataset for livestreaming videos. It features multiple speakers as well as interaction with a large number of audiences. The BehancePR corpus contains only ASR text. The training/development/testing datasets contain approximately 1.2 M, 34K, and 44K words, respectively. The disclosed method improves provides a significant performance improvement for different PR modules on real-world ASR tests on IWSLT and BehancePR (+3% and +2.3%, respectively).

Figure 15:
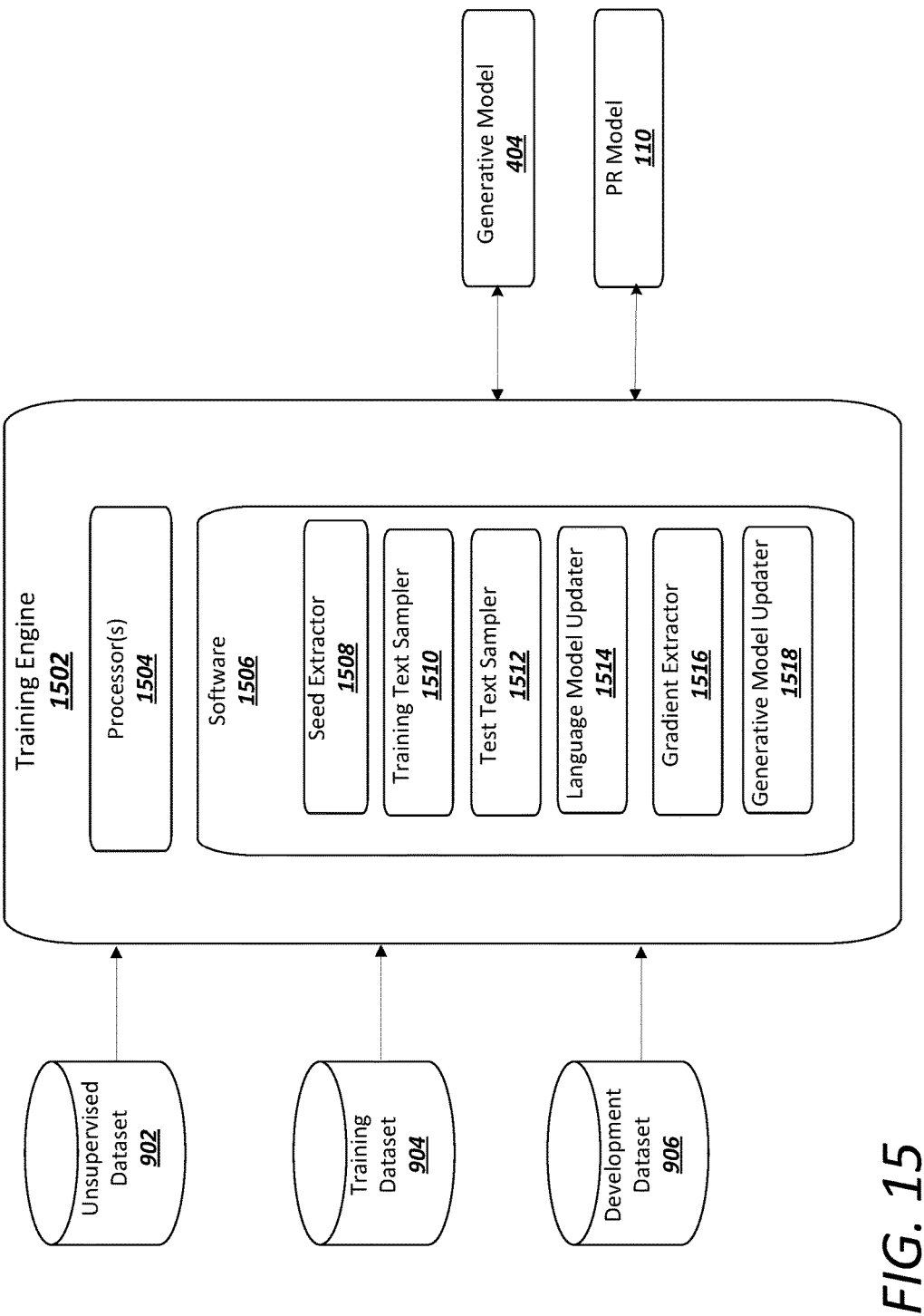
FIG. 15 is a block diagram illustrating a training system suitable for training of a PR model in accordance with at least one embodiment described herein.

FIG. 15 illustrates a system 1500 suitable for use in the training of a PR model 110. System 1500 includes training engine 1502 comprising one or more processors 1504 executing software 1506. Software 1506 performs functions necessary to train PR model 110 and to fine-tune generative model 404 in the manner described herein.

Seed extractor 1502 extracts the seed text 402 for generative model 404 from the unsupervised dataset 902. Training text sampler 1504 extracts training text 408 from training dataset 904 and the test text sampler 1506 extracts the test text 410 from development data set 906. Language model updater 1508 updates PR model 110 based on combined text 1002 consisting of training text 408 and generated text 406 generated by generative model 404. Gradient extractor 1510 calculates test gradient 1302 based on an input of the test text 410 to the updated PR model 1104 and generated gradient 1304 from an input of generated text 406. Generative model updater 1512 updates generative model 404 based on the calculation of the reward 412 from test gradient 1302 and the generated gradient 1304 in accordance with methods previously described herein.

PR model 110, as described herein, is an example of an AI/ML model trained by a supervised algorithm. A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it makes accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will or will not purchase a product; (3) decision tree which is a classification algorithm used to predict categorical outcomes by creating a decision tree based on the input features; or (4) random forest which is an ensemble algorithm that combines multiple decision trees to make more accurate predictions.

Figure 16:
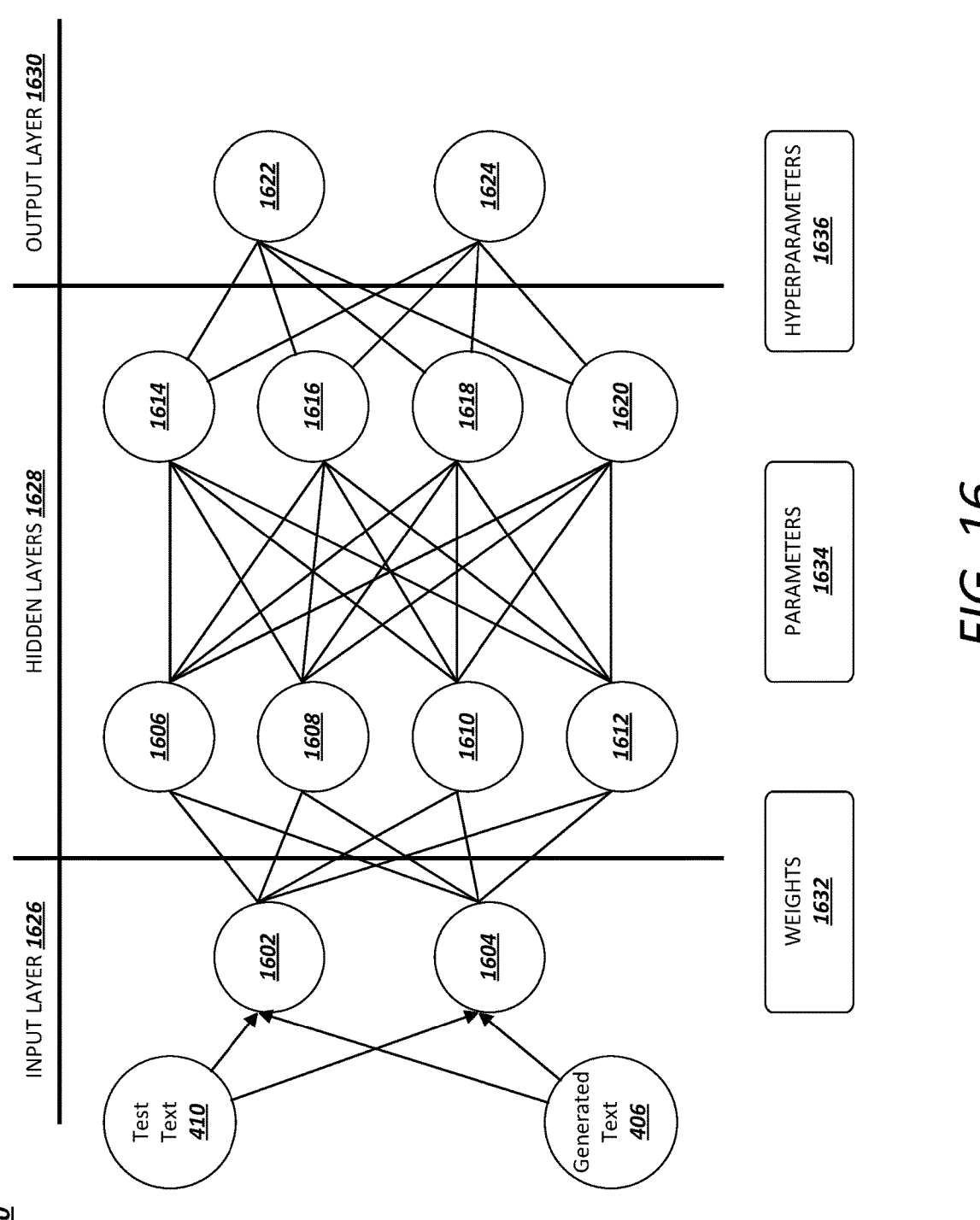
FIG. 16 is a schematic diagram illustrating an artificial intelligence architecture of the type which is used with the disclosed embodiments.

FIG. 16 illustrates an embodiment of an artificial neural network 1600 of the type appropriate for use as an implementation of PR model 110. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 1600 comprises multiple node layers, containing an input layer 1626, one or more hidden layers 1628, and an output layer 1630. Each layer comprises one or more nodes, such as nodes 1602 to 1624. As depicted in FIG. 16, for example, the input layer 1626 has nodes 1602, 1604. The illustrated artificial neural network 1600 has two hidden layers 1628, with a first hidden layer having nodes 1606, 1608, 1610 and 1612, and a second hidden layer having nodes 1614, 1616, 1618 and 1620. The artificial neural network 1600 has an output layer 1630 with nodes 1622, 1624. In some embodiments, PR model 110 is likely to have more hidden layers 1628 than those depicted in FIG. 16 and the number of nodes in each layer varies. For example, PR model 110 described herein as an example of a language model, in one embodiment, has 24 hidden layers, each of size 1024.

Each node 1602 to 1624 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 1600 relies on training data to learn and improve accuracy over time. However, once the artificial neural network 1600 is fine-tuned for accuracy, and tested on testing data, the artificial neural network 1600 is ready to classify and cluster new data 1630 at a high velocity. Tasks in speech recognition or image recognition can take minutes versus hours when compared to the manual identification by human experts.

Each individual node 1602 to 1624 is a linear regression model, composed of input data, weights, a bias (or threshold), and an output. Once an input layer 1626 is determined, a set of weights 1632 are assigned. The weights 1632 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming the input of the next node. The process of passing data from one layer to the next layer defines the artificial neural network 1600 as a feedforward network.

In one embodiment, the artificial neural network 1600 leverages sigmoid neurons, which are distinguished by having values between 0 and 1. Because the artificial neural network 1600 behaves similarly to a decision tree, cascading data from one node to another, having x values between 0 and 1 reduces the impact of any given change of a single variable on the output of any given node, and subsequently, the output of the artificial neural network 1600.

The artificial neural network 1600 has many practical use cases, like image recognition, speech recognition, text recognition or classification. The artificial neural network 1600 leverages supervised learning, or labeled datasets, to train the algorithm. As the model is trained, its accuracy is measured using a loss (or cost) function. This is also commonly referred to as the mean squared error (MSE).

Ultimately, the goal is to minimize the loss function to ensure correctness of fit for any given observation. As the model adjusts its weights and bias, it uses the loss function and reinforcement learning to reach the point of convergence, or the local minimum. The process in which the algorithm adjusts its weights is through gradient descent, allowing the model to determine the direction to take to reduce errors (or minimize the loss function). With each training example, the parameters 1634 of the model adjust to gradually converge at the minimum.

In one embodiment, the artificial neural network 1600 is feedforward, meaning it flows in one direction only, from input to output. In one embodiment, the artificial neural network 1600 uses backpropagation. Backpropagation is when the artificial neural network 1600 moves in the opposite direction from output to input. Back propagation allows calculation and attribution of errors associated with each neuron 1602 to 1624, thereby allowing adjustment to fit the parameters 1634 of the ML model 1630 appropriately.

The artificial neural network 1600 is implemented as different neural networks depending on a given task. Neural networks are classified into different types, which are used for different purposes. In one embodiment, the artificial neural network 1600 is implemented as a feedforward neural network, or multi-layer perceptrons (MLPs), comprised of an input layer 1626, hidden layers 1628, and an output layer 1630. While these neural networks are also commonly referred to as MLPs, they are actually comprised of sigmoid neurons, not perceptrons, as most real-world problems are nonlinear. Trained data usually is fed into these models to train them, and they are the foundation for computer vision, natural language processing, and other neural networks. In one embodiment, the artificial neural network 1600 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 1600 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 1600 is implemented as any type of neural network suitable for a given operational task of system 1600, and the MLP, CNN, and RNN are merely a few examples. Embodiments are not limited in this context.

The artificial neural network 1600 includes a set of associated parameters 1634. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 1600 is implemented as a deep learning neural network. The term deep learning neural network refers to a depth of layers in a given neural network. A neural network that has more than three layers (inclusive of the inputs and the output) is considered a deep learning algorithm. A neural network that only has two or three layers, however, is referred to as a basic neural network. A deep learning neural network tunes and optimizes one or more hyperparameters 1636. A hyperparameter is a parameter whose values are set before starting the model training process. Deep learning models, including convolutional neural network (CNN) and recurrent neural network (RNN) models have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 17:
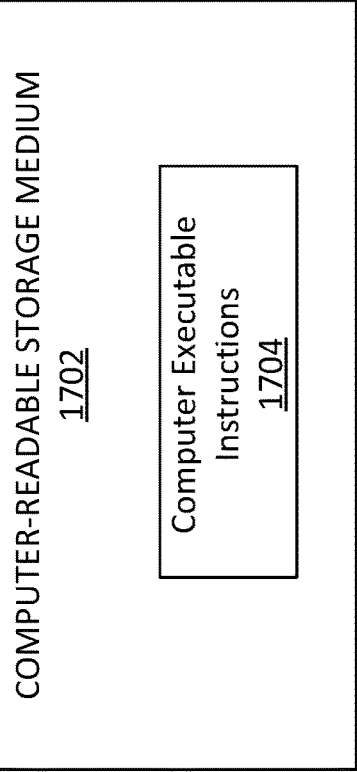
FIG. 17 is a block diagram illustrating a computer-readable storage medium of the type which is used with the disclosed embodiments.

FIG. 17 illustrates an apparatus 1700. Apparatus 1700 comprises any non-transitory computer-readable storage medium 1702 or machine-readable storage medium, such as an optical, magnetic or semiconductor storage medium. In various embodiments, apparatus 1700 comprises an article of manufacture or a product. In some embodiments, the computer-readable storage medium 1702 stores computer executable instructions 1704, for example, software 1506 shown in FIG. 15, which is executed by one or more processing devices or processing circuitry. For example, computer executable instructions 1704 includes instructions to implement operations described with respect to any logic flows described herein. Examples of computer-readable storage medium 1702 or machine-readable storage medium include any tangible media capable of storing electronic data, including volatile memory or non-volatile memory, removable or non-removable memory, erasable or non-erasable memory, writeable or rewriteable memory, and so forth. Examples of computer executable instructions 1704 include any suitable type of code, such as source code, compiled code, interpreted code, executable code, static code, dynamic code, object-oriented code, visual code, and the like.

Figure 18:
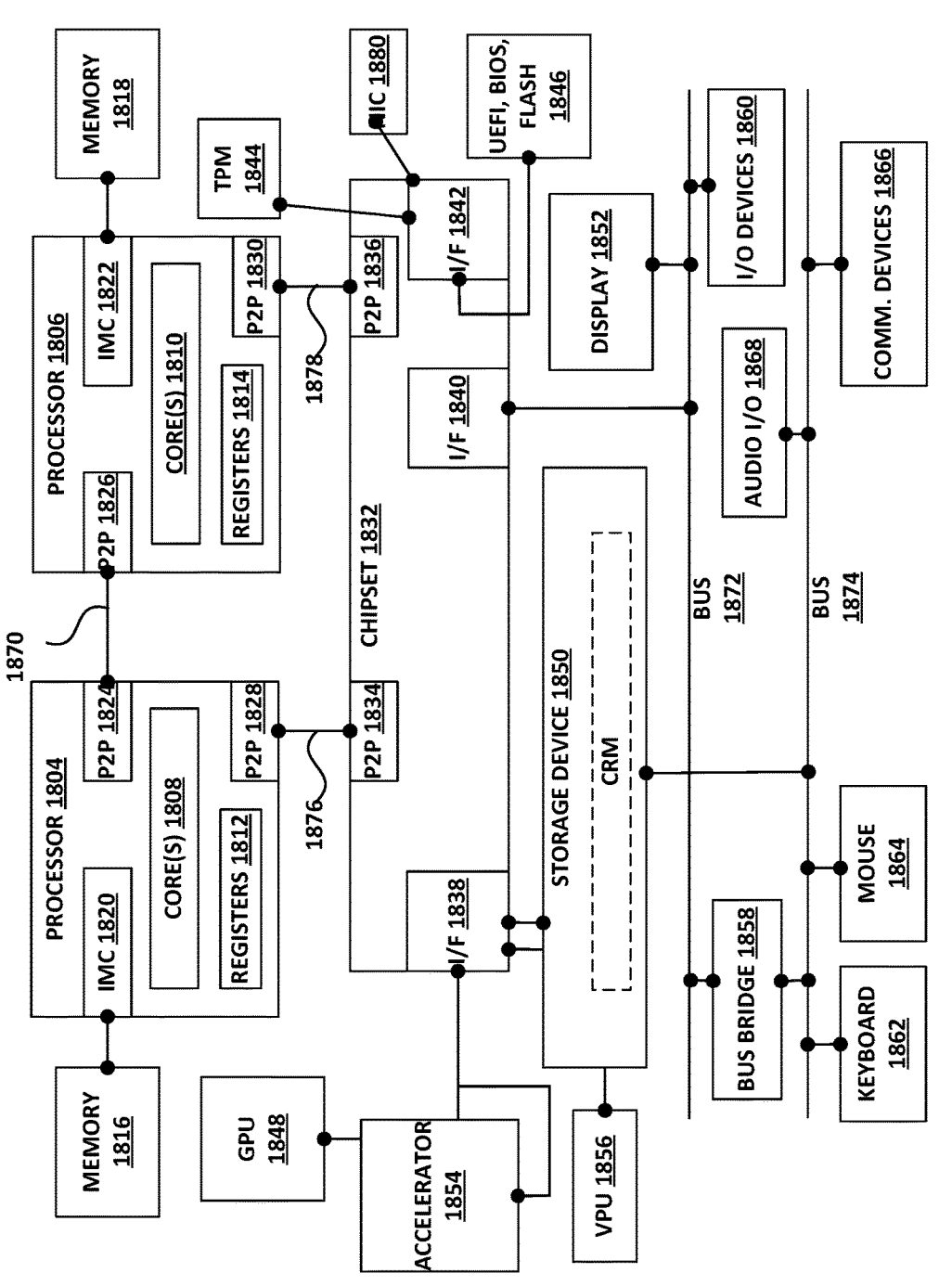
FIG. 18 is a block diagram illustrating a computing architecture of the type which is used with the disclosed embodiments.

FIG. 18 illustrates an embodiment of a computing architecture 1800. Computing architecture 1800 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments comprise, for example, entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1800 has a single processor with one core or more than one processor. Note that the term "processor" refers to a processor with a single core or a processor package with multiple processor cores. In at least one embodiment, the computing architecture 1800 is representative of the components of the system 1200. More generally, the computing architecture 1800 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1800. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages are sent across various connections. Exemplary connections include parallel interfaces, serial interfaces, and bus interfaces.

As shown in FIG. 18, computing architecture 1800 comprises a system-on-chip (SoC) 1802 for mounting platform components. System-on-chip (SoC) 1802 is a point-to-point (P2P) interconnect platform that includes a first processor 1804 and a second processor 1806 coupled via a point-to-point interconnect 1870 such as an Ultra Path Interconnect (UPI). In other embodiments, the computing architecture 1800 is another bus architecture, such as a multi-drop bus. Furthermore, each of processor 1804 and processor 1806 are processor packages with multiple processor cores including core(s) 1808 and core(s) 1810, respectively. While the computing architecture 1800 is an example of a two-socket (2S) platform, other embodiments include more than two sockets or one socket. For example, some embodiments include a four-socket (4S) platform or an eight-socket (8S) platform. Each socket is a mount for a processor and has a socket identifier. Note that the term platform refers to a motherboard with certain components mounted such as the processor 1804 and chipset 1832. Some platforms include additional components and some platforms include sockets to mount the processors and/or the chipset. Furthermore, some platforms do not have sockets (e.g., SoC, or the like). Although depicted as a SoC 1802, one or more of the components of the SoC 1802 are included in a single die package, a multi-chip module (MCM), a multi-die package, a chiplet, a bridge, and/or an interposer. Therefore, embodiments are not limited to a SoC.

The processor 1804 and processor 1806 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1804 and/or processor 1806. Additionally, the processor 1804 need not be identical to processor 1806.

Processor 1804 includes an integrated memory controller (IMC) 1820 and point-to-point (P2P) interface 1824 and P2P interface 1828. Similarly, the processor 1806 includes an IMC 1822 as well as P2P interface 1814 and P2P interface 1830. IMC 1820 and IMC 1822 couple the processor 1804 and processor 1806, respectively, to respective memories (e.g., memory 1816 and memory 1818). Memory 1816 and memory 1818 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1816 and the memory 1818 locally attach to the respective processors (i.e., processor 1804 and processor 1806). In other embodiments, the main memory couple with the processors via a bus and shared memory hub. Processor 1804 includes registers 1812 and processor 1806 includes registers 1814.

Computing architecture 1800 includes chipset 1832 coupled to processor 1804 and processor 1806. Furthermore, chipset 1832 are coupled to storage device 1850, for example, via an interface (I/F) 1838. The I/F 1838 is, in various embodiments, a Peripheral Component Interconnect-enhanced (PCIe) interface, a Compute Express Link® (CXL) interface, or a Universal Chiplet Interconnect Express (UCIe) interface. Storage device 1850 stores instructions executable by circuitry of computing architecture 1800 (e.g., processor 1804, processor 1806, GPU 1848, accelerator 1854, vision processing unit 1856, or the like). For example, storage device 1850 stores instructions for training engine 1502 or the like.

Processor 1804 couples to the chipset 1832 via P2P interface 1828 and P2P 1834 while processor 1806 couples to the chipset 1832 via P2P interface 1830 and P2P 1836. Direct media interface (DMI) 1876 and DMI 1878 couple the P2P interface 1828 and the P2P 1834 and the P2P interface 1830 and P2P 1836, respectively. DMI 1876 and DMI 1878 is a high-speed interconnect that facilitates, for example, eight Giga Transfers per second (GT/s) such as DMI 3.0. In other embodiments, the processor 1804 and processor 1806 interconnect via a bus.

The chipset 1832 comprises a controller hub such as a platform controller hub (PCH). The chipset 1832 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1832 comprises more than one controller hub such as a chipset with a memory controller hub, a graphics controller hub, and an input/output (I/O) controller hub.

In the depicted example, chipset 1832 couples with a trusted platform module (TPM) 1844 and UEFI, BIOS, FLASH circuitry 1846 via I/F 1842. The TPM 1844 is a dedicated microcontroller designed to secure hardware by integrating cryptographic keys into devices. The UEFI, BIOS, FLASH circuitry 1846 provide pre-boot code. The I/F 1842 is also coupled to a network interface circuit (NIC) 1880 for connections off-chip.

Furthermore, chipset 1832 includes the I/F 1838 to couple chipset 1832 with a high-performance graphics engine, such as, graphics processing circuitry or a graphics processing unit (GPU) 1848. In other embodiments, the computing architecture 1800 includes a flexible display interface (FDI) (not shown) between the processor 1804 and/or the processor 1806 and the chipset 1832. The FDI interconnects a graphics processor core in one or more of processor 1804 and/or processor 1806 with the chipset 1832.

The computing architecture 1800 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 1854 and/or vision processing unit 1856 are coupled to chipset 1832 via I/F 1838. The accelerator 1854 is representative of any type of accelerator device (e.g., a data streaming accelerator, cryptographic accelerator, cryptographic co-processor, an offload engine, etc.). One example of an accelerator 1854 is the Intel® Data Streaming Accelerator (DSA). The accelerator 1854 is a device including circuitry to accelerate copy operations, data encryption, hash value computation, data comparison operations (including comparison of data in memory 1816 and/or memory 1818), and/or data compression. Examples for the accelerator 1854 include a USB device, PCI device, PCIe device, CXL device, UCIe device, and/or an SPI device. The accelerator 1854 also includes circuitry arranged to execute machine learning (ML) related operations (e.g., training, inference, etc.) for ML models. Generally, the accelerator 1854 is specially designed to perform computationally intensive operations, such as hash value computations, comparison operations, cryptographic operations, and/or compression operations, in a manner that is more efficient than when performed by the processor 1804 or processor 1806. Because the load of the computing architecture 1800 includes hash value computations, comparison operations, cryptographic operations, and/or compression operations, the accelerator 1854 greatly increases performance of the computing architecture 1800 for these operations.

The accelerator 1854 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1854. For example, the accelerator 1854 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1854 via a non-posted write (e.g., a deferred memory write (DMWr)). One example of an instruction that atomically submits a work descriptor to the shared work queue of the accelerator 1854 is the ENQCMD command or instruction supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1854. The dedicated work queue accepts job submissions via commands such as the movdir64b instruction.

Various I/O devices 1860 and display 1852 couple to the bus 1872, along with a bus bridge 1858 which couples the bus 1872 to a second bus 1874 and an I/F 1840 that connects the bus 1872 with the chipset 1832. In one embodiment, the second bus 1874 is a low pin count (LPC) bus. Various input/output (I/O) devices couple to the second bus 1874 including, for example, a keyboard 1862, a mouse 1864 and communication devices 1866.

Furthermore, an audio I/O 1868 couples to second bus 1874. Many of the I/O devices 1860 and communication devices 1866 reside on the system-on-chip (SoC) 1802 while the keyboard 1862 and the mouse 1864 are add-on peripherals. In other embodiments, some or all the I/O devices 1860 and communication devices 1866 are add-on peripherals and do not reside on the system-on-chip (SoC) 1802.

Figure 19:
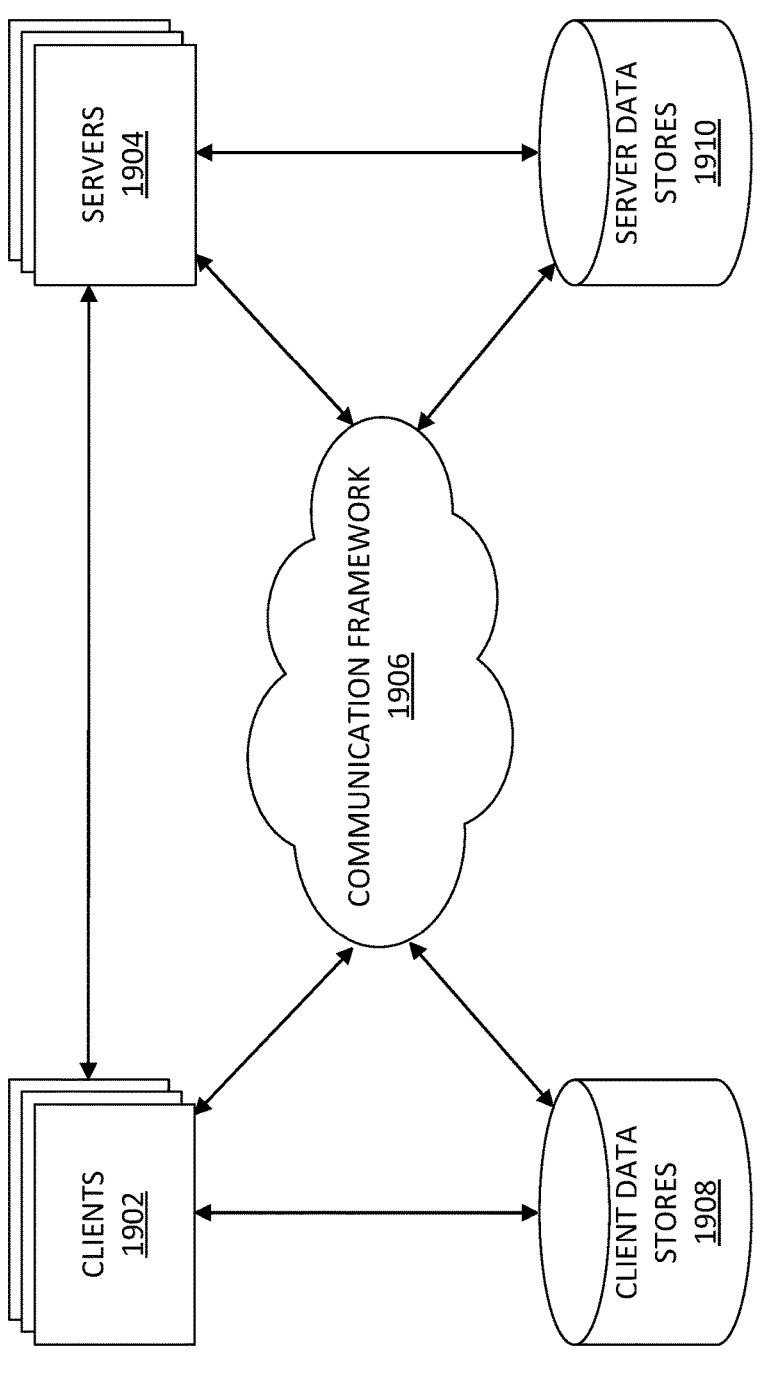
FIG. 19 is a block diagram illustrating a communications architecture of the type which is used with the disclosed embodiments.

FIG. 19 illustrates a block diagram of an exemplary communications architecture 1000 suitable for implementing various embodiments as previously described. The communications architecture 1900 includes various common communications elements, such as a transmitter, receiver, transceiver, radio, network interface, baseband processor, antenna, amplifiers, filters, power supplies, and so forth. The embodiments, however, are not limited to implementation by the communications architecture 1900.

As shown in FIG. 19, the communications architecture 1900 includes one or more clients 1902 and servers 1904. The clients 1902 and the servers 1904 are operatively connected to one or more respective client data stores 1908 and server data stores 1910 that are employed to store information local to the respective clients 1902 and servers 1904, such as cookies and/or associated contextual information.

The clients 1902 and the servers 1904 communicate information between each other using a communication framework 1906. The communication framework 1906 implements any well-known communications techniques and protocols. The communication framework 1906 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1906 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/2100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. If processing requirements dictate a greater amount speed and capacity, distributed network controller architectures are similarly employed to pool, load balance, and otherwise increase the communicative bandwidth required by clients 1902 and the servers 1904. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which stores an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magnet-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" is to be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items are distinct, although in some situations the context indicates that they are distinct or that they are the same.

As used herein, the term "circuitry" refers to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements are collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method, comprising:
   sampling seed text from a topic-specific unsupervised dataset;
   receiving the seed text by a generative model as input;
   producing generated text using the generative model based on the seed text to control a topic of the generated text;
   combining the generated text with training text sampled from a training dataset to form combined text;
   updating a language model with the combined text, wherein the language model is a punctuation restoration model to generate punctuated text from an input of unpunctuated text;
   obtaining a first gradient from the updated language model based on test text sampled from a development dataset;
   obtaining a second gradient from the updated language model based on the generated text;
   computing, based on a similarity comparison of the first gradient and the second gradient, a reward based on effectiveness of the generated text as training data for the updated language model indicated by alignment of the first gradient with the second gradient; and
   adjusting the generative model using the reward.

2. The method of claim 1, wherein the generated text is synthetic labeled data comprising punctuated text in a style of spoken speech.

3. The method of claim 1, further comprising training the language model with the combined text based on a cross-entropy loss function.

4. The method of claim 1, wherein the reward is computed by combining the first gradient and the second gradient using cosine similarity scores.

5. The method of claim 1, wherein the reward is computed for each of a plurality of test texts sampled from the development dataset to create a respective reward for each of the plurality of test texts.

6. The method of claim 1, wherein the first gradient represents an average gradient of the updated language model over a sampled subset of the development dataset and the second gradient represents an average gradient of the updated language model over the generated text for each training iteration.

7. The method of claim 1, further comprising augmenting the training dataset by adding noise indicative of spoken text to the training dataset.

8. The method of claim 1, further comprising performing punctuation restoration operations for text generated by an automatic speech recognition system using the language model.

9. The method of claim 1, wherein the language model and the generative model are iteratively updated over a plurality of iterations, and the updated language model from a current iteration is used as the language model in a next iteration.

10. The method of claim 1, wherein the generative model is trained to generate punctuated text in a style of spoken speech, and the generated text is converted to labeled data for training the language model.

11. A system, comprising:
a memory component; and
one or more processing devices coupled to the memory component, the one or more processing devices to perform operations comprising:
  input a seed text to a generative model from a topic-specific unsupervised dataset;
  receive generated text produced by the generative model based on the seed text to control a topic of the generated text;
  combine the generated text with training text sampled from a training dataset;
  update a language model with a combination of the generated text and the training text, wherein the language model is a punctuation restoration model to generate punctuated text from an input of unpunctuated text;
  obtain a first gradient from the updated language model based on one or more samples of text extracted from a development dataset;
  obtain a second gradient from the updated language model based on the generated text;
  compute, based on a similarity comparison of the first gradient and the second gradient, a reward based on effectiveness of the generated text as training data for the updated language model indicated by alignment of the first gradient with the second gradient; and
  adjust the generative model using the reward.

12. The system of claim 11, wherein the generated text is synthetic labeled data comprising punctuated text in a style of spoken speech.

13. The system of claim 11, the one or more processing devices to combine the training text and the generated text in equal portions.

14. The system of claim 11 wherein the reward is computed for each of the one or more samples of text extracted from the development dataset to create a respective reward for each sample.

15. The system of claim 11, wherein the generative model comprises a generative pre-trained transformer model that generates the generated text by predicting a next word following the seed text.

16. A non-transitory computer-readable medium storing executable instructions, which when executed by one or more processing devices, cause the one or more processing devices to perform operations comprising:
  sample seed text from a topic-specific unsupervised dataset;
  receive the seed text by a generative model as input;
  produce generated text using the generative model based on the seed text to control a topic of the generated text;
  update a language model with a combination of the generated text and training text sampled from a training dataset, wherein the language model is a punctuation restoration model to generate punctuated text from an input of unpunctuated text;
  obtain a first gradient from the updated language model based on one or more samples of text extracted from a development dataset;
  obtain a second gradient from the updated language model based on the generated text;
  compute, based on a similarity comparison of the first gradient and the second gradient, a reward based on effectiveness of the generated text as training data for the updated language model indicated by alignment of the first gradient with the second gradient; and
  adjust the generative model using the reward.

17. The non-transitory computer-readable medium of claim 16, wherein the reward is based on a cosine similarity of the first gradient and the second gradient.

18. The non-transitory computer-readable medium of claim 16, wherein the first gradient and the second gradient are each based on a cross-entropy loss of the updated language model.

19. The non-transitory computer-readable medium of claim 16, comprising instructions, which when executed by one or more processing devices, cause the one or more processing devices to augment the training dataset by adding noise indicative of spoken text to the training dataset.

20. The non-transitory computer-readable medium of claim 16, wherein the language model implements punctuation restoration as a sequence labeling task in which each punctuation symbol is a label predicted by the language model.

\* \* \* \* \*